(12) United States Patent
Richarte et al.

(10) Patent No.: US 10,805,515 B2
(45) Date of Patent: *Oct. 13, 2020

(54) IMAGING DEVICE FOR SCENES IN APPARENT MOTION

(71) Applicant: Urugus S.A., Montevideo (UY)

(72) Inventors: Gerardo Gabriel Richarte, Caba (AR); Emiliano Kargieman, Buenos Aires (AR); Juan Manuel Vuletich, Provincia de BsAs (AR)

(73) Assignee: Urugus S.A., Montevideo (UY)

(*) Notice: Subject to any disclaimer, the term of this patent is extended or adjusted under 35 U.S.C. 154(b) by 0 days.

This patent is subject to a terminal disclaimer.

(21) Appl. No.: 16/424,267

(22) Filed: May 28, 2019

(65) Prior Publication Data

US 2019/0297239 A1    Sep. 26, 2019

Related U.S. Application Data

(63) Continuation of application No. 15/721,600, filed on Sep. 29, 2017, now Pat. No. 10,341,547, which is a
(Continued)

(51) Int. Cl.
*H04N 5/232* (2006.01)
*G02B 27/64* (2006.01)
(Continued)

(52) U.S. Cl.
CPC ........... *H04N 5/232* (2013.01); *B64G 1/1021* (2013.01); *G01C 11/02* (2013.01); *G01C 11/025* (2013.01);
(Continued)

(58) Field of Classification Search
CPC .. H04N 5/232; H04N 5/2353; H04N 5/23248; H04N 5/2259; H04N 5/23287;
(Continued)

(56) References Cited

U.S. PATENT DOCUMENTS

| 4,687,161 A | 8/1987 | Plescia et al. |
| 4,908,705 A | 3/1990 | Wight |

(Continued)

FOREIGN PATENT DOCUMENTS

| EP | 0796786 A1 | 9/1997 |
| EP | 1667428 B1 | 6/2006 |

(Continued)

OTHER PUBLICATIONS

Anonymous, "Pixel Shift Technology", Retreived on Sep. 24, 2018 from: URL:https://www.stemmer-imaging.co.uk/en/knowledge-base/pixel-shifttechnology/ :, Jan. 31, 2014, Stemmer Imaging, 4 pages.

(Continued)

*Primary Examiner* — Jared Walker
(74) *Attorney, Agent, or Firm* — Lee & Hayes, P.C.

(57) ABSTRACT

Imaging systems and methods for imaging of scenes in apparent motion are described. A multi-axis positioning mechanism is operable to move an area imaging device along a tracking axis. A control module directs the multi-axis positioning mechanism to set the tracking axis to be substantially parallel with the apparent motion, and directs the multi-axis positioning mechanism to move the area imaging device in one or more cycles such that the area imaging device moves, in each of the one or more cycles, forward along the tracking axis at a tracking speed that compensates for the apparent motion. The control module directs the area imaging device to take at least one exposure during each of the one or more cycles to generate one or more exposures. An imaging module forms an image of the scene based on the one or more exposures.

30 Claims, 16 Drawing Sheets

Related U.S. Application Data continuation of application No. 14/704,859, filed on May 5, 2015, now Pat. No. 9,813,601.

(60) Provisional application No. 61/989,165, filed on May 6, 2014.

(51) Int. Cl.
| | | |
|---|---|---|
| *H04N 5/225* | (2006.01) | |
| *G01C 11/02* | (2006.01) | |
| *H04N 5/235* | (2006.01) | |
| *B64G 1/10* | (2006.01) | |
| *G03B 17/56* | (2006.01) | |
| *G03B 15/00* | (2006.01) | |

(52) U.S. Cl.
CPC ......... *G02B 27/644* (2013.01); *G03B 15/006* (2013.01); *G03B 17/561* (2013.01); *H04N 5/2259* (2013.01); *H04N 5/2353* (2013.01); *H04N 5/23248* (2013.01); *H04N 5/23287* (2013.01); *B64G 2001/1028* (2013.01)

(58) Field of Classification Search
CPC .. G03B 17/561; G03B 15/006; G01C 11/025; G02B 27/644; B64G 2001/1028
USPC ......................................................... 348/144
See application file for complete search history.

(56) References Cited

U.S. PATENT DOCUMENTS

| | | | |
|---|---|---|---|
| 5,030,984 | A | 7/1991 | Buckler et al. |
| 5,460,341 | A | 10/1995 | Katsuyama et al. |
| 5,604,534 | A | 2/1997 | Hedges et al. |
| 5,654,549 | A | 8/1997 | Landecker et al. |
| 6,798,984 | B2 | 9/2004 | Antikidis |
| 8,548,313 | B2 | 10/2013 | Krueger |
| 2010/0103251 | A1 | 4/2010 | Numako |
| 2013/0094705 | A1 | 4/2013 | Tyagi et al. |
| 2015/0326769 | A1 | 11/2015 | Richarte et al. |
| 2018/0027161 | A1 | 1/2018 | Richarte et al. |

FOREIGN PATENT DOCUMENTS

| | | |
|---|---|---|
| EP | 1873574 | 1/2008 |
| JP | H11234547 | 8/1999 |
| WO | WO9641480 | 12/1996 |
| WO | WO2012020413 | 2/2012 |

OTHER PUBLICATIONS

Bhanu et al., "A System for Obstacle Detection During Rotorcraft Low-Altitude Flight", Proceedings of the First IEEE Workshop on Applications of Computer Vision, Nov. 1992, pp. 92-99.

Borman, et al., "Spatial Resolution Enhancement of Low-Resolution Image Sequences—A Comprehensive Review with Directions for Future Research", University of Notre Dame, Laboratory for Image and Signal Analysis (LISA), Jul. 1998, 64 pages.

Devlin, et al., "Tone Reproduction and Physically Based Spectral Rendering", STAR Report, Eurographics 2002, Sep. 2002, 23 pages.

The European Office Action dated Sep. 28, 2018 for European Application No. 15723870.0, a counterpart foreign patent application of the U.S. Appl. No. 14/704,859, 4 pages.

Helm et al., "Improved three-dimentional image correlation for surface displacement measurement", Opt. Eng. 35 (7), Jul. 1996, pp. 1911-1920.

Janschek, et al, "Optical Correlator for Image Motion Compensation in the Focal Plane of a Satellite Camera", 15th IFAC Symposium on Automatic Control in Aerospace, Sep. 2001, 5 pgs.

Masursky et al., "Planetary Imaging: Past, Present, and Future", IEEE Transactions on Geoscience Electronics, vol. GE-14, No. 3, Jul. 1976, pp. 122-134.

Office action for U.S. Appl. No. 14/704,859, dated Jan. 30, 2017, Kargieman et al., "Imaging Device for Scenes in Apparent Motion", 15 pages.

Office action for U.S. Appl. No. 15/721,600, dated Aug. 7, 2018, Richarte, "Imaging Device for Scenes in Apparent Motion", 11 pages.

PCT Search Report and Written Opinion dated Aug. 3, 2015 for PCT Application No. PCT/EP2015/059996, 12 Pages.

Smith et al, "The ExoplanetSat Mission to Detect Transiting Exoplanets with a CubeSat Space Telescope", 25th Annual AIAA-USU Conf on Small Satellites, Aug. 2011, 9 pgs.

Sony, "The Technology Behind Sony Alpha DSLR's Steadyshot Inside", retrieved Oct. 28, 2015 at http://www.sonyinsider.com/2009/12/17/the-technology-behind-sony-alpha-dslrs-steadyshot-inside/, 5 pgs.

The Summons to Attend Oral Proceedings dated Aug. 20, 2019, for Eurpean Patent Application No. 15723870.0, a counterpart foreign application of the U.S. Appl. No. 14/704,859, 9 pages.

The Israel Office Action dated Sep. 22, 2019 for Israel Patent Application No. 248503, a counterpart foreign application of the U.S. Appl. No. 14/704,859, 6 pages.

Wu, el al., "Study on a Fast Motion Estimation Algorithm of Video Stabilization System", Journal of Convergence Information Tcx:hnology(JCIT), vol. 8, No. 8, Apr. 2013, 9 pages.

The Japanese Office Action dated Jul. 9, 2019m for Japanese Patent Application No. 2017-510756, a counterpart foreign application of the U.S. Appl. No. 14/704,859, 15 pages.

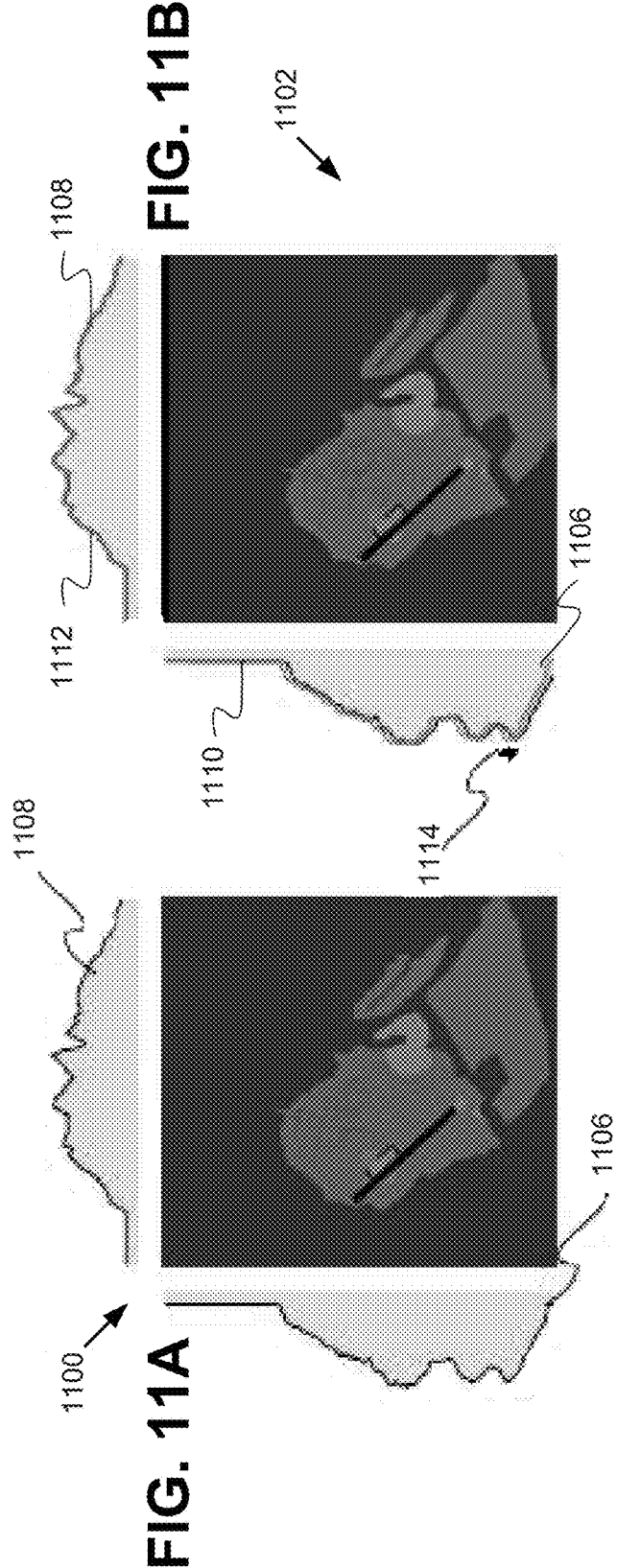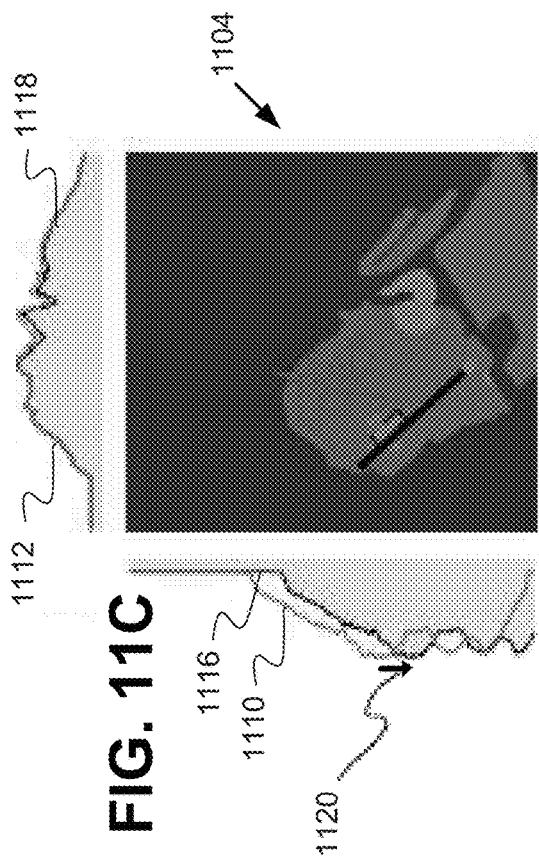
FIG. 11A
FIG. 11B
FIG. 11C

IMAGING DEVICE FOR SCENES IN APPARENT MOTION

CROSS REFERENCE TO RELATED APPLICATION

This patent application is a continuation of, and claims priority to, co-pending U.S. patent application Ser. No. 15/721,600 filed Sep. 29, 2017, entitled "IMAGING DEVICE FOR SCENES IN APPARENT MOTION," which is a continuation of, and claims priority to U.S. patent application Ser. No. 14/704,859 filed May 5, 2015, now issued as U.S. Pat. No. 9,813,601 and entitled "IMAGING DEVICE FOR SCENES IN APPARENT MOTION," which application claims the benefit of U.S. Provisional Patent Application Ser. No. 61/989,165 filed May 6, 2014, entitled "DEVICE FOR MULTI-SPECTRAL IMAGING AND VIDEO WHEN OBSERVED SCENE IS IN APPARENT MOTION", which are all hereby incorporated in their entirety by reference.

BACKGROUND

When a scene is in apparent motion relative to an imaging device, collecting sufficient light to achieve a suitable dynamic range while preventing motion blur and artifacts can be difficult. In the case of satellite or airborne-based observation systems, this is a particular concern. A shorter exposure time may result in insufficient light exposure. Increasing the exposure time results in blurring. In a conventional satellite imaging system, this problem may be solved by increasing the effective aperture of the optics in order to collect more light during a given exposure time. But doing so increases both the size and weight of the optics, which greatly increases costs associated with satellite systems in particular.

Various conventional imaging systems address these concerns in various ways and with varying degrees of success. Some systems utilize linear sensors having elongated pixels or, alternatively, Time Domain Integration (TDI) sensors to compensate for apparent motion. These solutions require the imaging device to be aligned with the direction of apparent motion, and often require that the satellite system compensate for payload torques. In other imaging systems, mirrors, lenses, or the imaging sensors themselves are moved in the direction of travel in order to compensate for the direction of travel. Still other systems utilize computationally intensive solutions to compute motion and to direct the recording medium to move in order to compensate for motion.

In general, these systems are large and heavy, computationally intensive, complex, or all of the above.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIGS. 11A-C illustrate successive images and associated gray projections that are used to determine a speed of travel and a run length of the imaging device.

DETAILED DESCRIPTION

Overview

Figure 1:
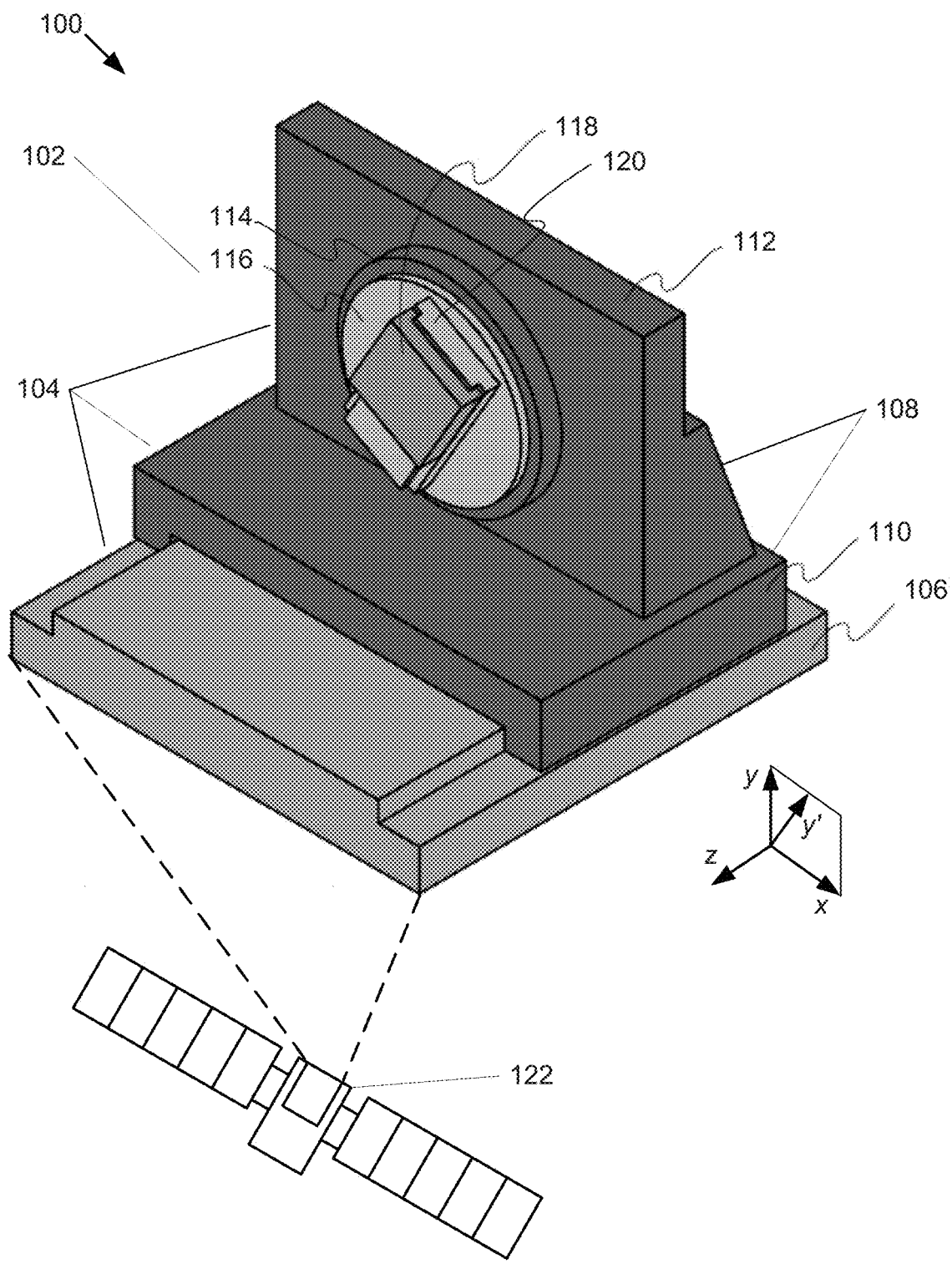
FIG. 1 illustrates an isometric view of an example imaging device having a multi-axis positioning mechanism for imaging scenes in apparent motion.

Embodiments include an imaging system, such as an aerial or satellite-based imaging system, having a multi-axis positioning mechanism, a multi-band optical filter, and employing various computational algorithms in a processing unit (e.g., a processor or other logic circuit) to capture and process images of a scene in apparent motion with a suitable dynamic range while preventing motion blur and other visual artifacts.

Embodiments control the multi-axis positioning mechanism to align a tracking axis of an area imaging device (AID) (e.g., a type of image capture device) in the direction of apparent motion. A tracking speed of the AID is determined to compensate for the speed of apparent motion. A run length is determined to enable sufficient time for one or more exposures while the AID is moved through its run length. Multiple partially overlapping exposures are captured by causing the AID to cycle through multiple runs along the tracking axis. In a single cycle, the multi-axis positioning mechanism causes the AID to move along the tracking axis in the direction of apparent motion according to the determined run length and the tracking speed before returning to the starting position to begin the next cycle. The exposures in each successive cycle have a determined amount of overlap, which enables the exposures to be stitched together to form an image of arbitrary length. Each segment of the image is exposed through all bands of the multi-optical filter during successive cycles.

By aligning the tracking axis and setting a tracking speed to compensate for the apparent motion, blur is eliminated or reduced while capturing the image itself, thereby reducing computational complexity of the system. In short, the image capture device is temporarily moved at a speed and in a direction that is the same as that of the apparent motion, for a sufficient amount of exposure time, to result in a suitable dynamic range image that is free from motion blur. Each segment of the image is exposed through different bands of the multi-band optical filter to allow for multi-spectral images.

A stitching algorithm is utilized in some embodiments to generate a final image (or video frame) from the multiple partially overlapping exposures. Multiple exposures may be captured during each cycle. Each intra-cycle exposure may have a different exposure time, in order to provide advantageous or optimal exposure times for each filter band, in order to generate a high dynamic range image. Multiple exposures during each cycle may be captured at slightly different horizontal or vertical positions (perpendicular to the tracking axis), which may be less than a pixel's distance apart, in order to generate slightly horizontally or vertically offset exposures that are used to generate an increased resolution image. Horizontally offset exposures may be obtained by using a horizontal linear actuator, which moves the imaging device perpendicular to the direction of apparent motion (i.e., perpendicular to the tracking axis of the imaging device). Vertically offset exposures may be obtained by the tracking actuator being repositioned to a slightly offset position, such as length equal to ½ of a pixel, from the original position of the previous exposure. In embodiments, images that are both horizontally and vertically offset can be obtained for even further improved resolution.

Some embodiments of the imaging systems and apparatus described herein may be employed to take images of Earth from satellites, such as satellites in Low Earth Orbit (LEO). LEO satellites orbit at speeds relative to a stationary point on the Earth that make motion blur an important issue. In satellite embodiments, the imaging system includes a telescope and the AID is placed at the focal plane of the telescope. The aperture and focal distance of the telescope is selected so that the exposure times of typical ground scenes are below the cycle time of the multi-axis positioning mechanism.

Embodiments do not require the imaging device to be aligned with the direction of apparent motion, which is especially useful in satellite-based systems that are prone to rotation independent of their motion. Systems according to embodiments are simple, compact, and lightweight while also enabling multi-spectral imaging and live video while the observed scene is in apparent motion relative to the imaging apparatus while minimizing image artifacts such as blur, skew, wobble, and defocus aberrations. Embodiments also enable high dynamic range (HDR) imaging and spatial resolution enhancement.

The processes, systems, and devices described herein may be implemented in a number of ways. Example implementations are provided below with reference to the following figures.

Example Imaging Device

FIG. 1 illustrates an isometric view 100 of an example imaging device 102 having a multi-axis positioning mechanism 104 for imaging scenes in apparent motion. In the illustrative embodiment depicted in FIG. 1, the multi-axis positioning mechanism 104 includes a focus rail 106 aligned with the z axis. The focus rail 106 includes a linear actuator, such as an electric motor, and is used to focus the imaging device 102. The length of the focus rail 106 is, in embodiments, at least as long as any variations in the focus position of the imaging device 102. In embodiments for which the distance between the imaging device 102 and the focus position is expected to remain constant or to have a sufficiently small variation (such as in a satellite imaging system), the run length of focus rail 106 may be set to a length slightly longer than the confocal length of the imaging device 102, such as between a few microns and a few millimeters. Where the variation in focus position is expected to be sufficiently small, the focus may be adjusted in post-processing, e.g., algorithmically, thereby enabling the manufacturing tolerances in the linear actuator to be relatively relaxed. The linear actuator need not be particularly fast, although it may be.

Stand 108 may be somewhat L-shaped, and includes a platform 110 that is moved by the linear actuator along the z axis of the focus rail 106. The stand 108 includes a vertical member 112, which includes a circular rail 114. Circular plate 116 rotates within circular rail 114, controlled by a rotary actuator beneath or otherwise coupled to the circular plate 116. A platform 118 is situated on tracking rail 120 of the circular plate 116. A linear actuator causes the platform 118 to move along the tracking rail 120, along a tracking axis y'. In some embodiments, a transverse actuator that moves the platform 118 along a transverse axis that is perpendicular to the tracking axis is also included.

Figure 6:
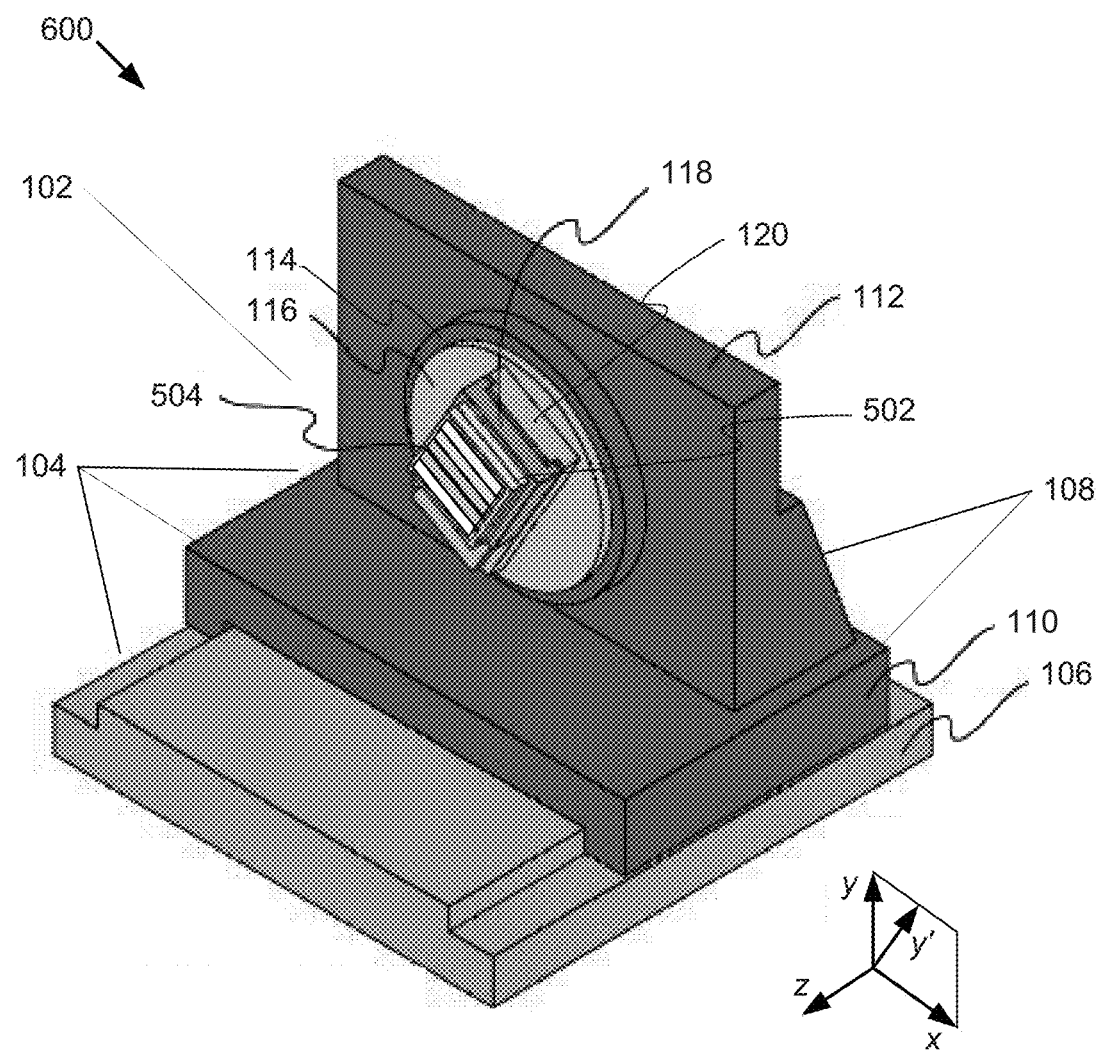
FIG. 6 illustrates an isometric view of an example imaging device having an area imaging device and a multi-band optical filter provided thereon.

The rotary actuator causes the circular plate 116 to rotate, thereby orienting the tracking axis y' of the tracking rail 120. In embodiments, the tracking axis y' is oriented to be substantially parallel with the direction of apparent motion of the scene being imaged, as will be described in more detail elsewhere within this Detailed Description. The possible degree of rotation of the circular plate 116 is, in some embodiments, at least 180 degrees to enable orienting of the tracking rail 120 to be at any angle, in order to account for any possible direction of apparent motion. The degree of rotation may be greater than 180 degrees in order to avoid potential problems where the direction of apparent motion happens to be near the rotational limit of the circular plate 116. The rotary actuator is sufficiently precise to maintain any misalignment between the tracking axis y' and the direction of apparent motion to be less than a single pixel of an area imaging device (which is positioned on the platform 118 as shown in FIG. 6). The rotational actuator may be a piezoelectric or stepper motor, or other suitable actuator or positioning mechanism.

The tracking rail 120 includes a linear actuator underneath or otherwise coupled to the platform 118. The linear actuator is operable to move the platform 118 along the tracking rail 120 to compensate for the apparent motion of the scene being imaged. The linear actuator for tracking is sufficiently fast to displace the platform 118 at the speed of apparent motion, and to return to a start position sufficiently quickly such that another image exposure cycle can be accomplished with sufficient overlap between successively captured exposures and to increase the exposure time available to capture images. Jitter (variability in movement speed) of the linear actuator for tracking is less than a pixel of the area imaging device to avoid blurring of the resulting images. The linear actuator for tracking may be a piezoelectric motor, a stepper motor, or other suitable actuator or device.

Improved resolution images may be obtained using vertically offset exposures between successive images within a cycle, horizontally offset exposures between successive images within a cycle, or both horizontally and vertically offset exposures (which may include one or more additional exposures that are both horizontally and vertically offset from an original exposure, or two additional exposures one of which is horizontally offset and the other of which is vertically offset from an original exposure). Vertically offset images, such as images with ½ of a pixel displacement in a direction or other displacement that is not an integer multiple of a whole pixel, enable additional resolution in the vertical direction. In these embodiments, the linear actuator for tracking repositions of the imaging device to within an offset distance, such as ½ a pixel, from the original position of a previously captured exposure. The two vertically offset images are processed as described elsewhere within this Detailed Description to produce a higher resolution image.

In some embodiments, to produce horizontally offset exposures, a transverse actuator that moves the platform 118 along a transverse axis that is perpendicular to the tracking axis y' is also included. The run length of the transverse actuator is used for generating higher resolution images. The transverse actuator is a piezo displacement actuator or other suitable high-resolution actuator.

In the example illustrated in FIG. 1, the multi-axis positioning mechanism 104 includes a rotational actuator, which rotates the tracking rail 120 to be substantially parallel with the tracking axis y' and a linear actuator to move the tracking rail in the direction of the tracking axis y' In alternative embodiments, such as are illustrated in FIGS. 15A-D (although other examples are possible without departing from the scope of embodiments), two actuators, an x actuator and a y actuator are simultaneously moved such that the imaging device tracks the direction of apparent motion (e.g., the tracking axis y'). Determining the speeds of tracking of the x and y actuators is determined in a substantially similar way.

In the example illustrated in FIG. 1, the imaging device is included in a satellite 122. The satellite 122 may be a Low Earth Orbit (LEO) satellite or some other type of satellite without departing from the scope of embodiments. In other embodiments, the imaging device 122 may be on-board an aircraft (manned or unmanned), another type of spacecraft (manned or unmanned), and so forth.

Figure 2:
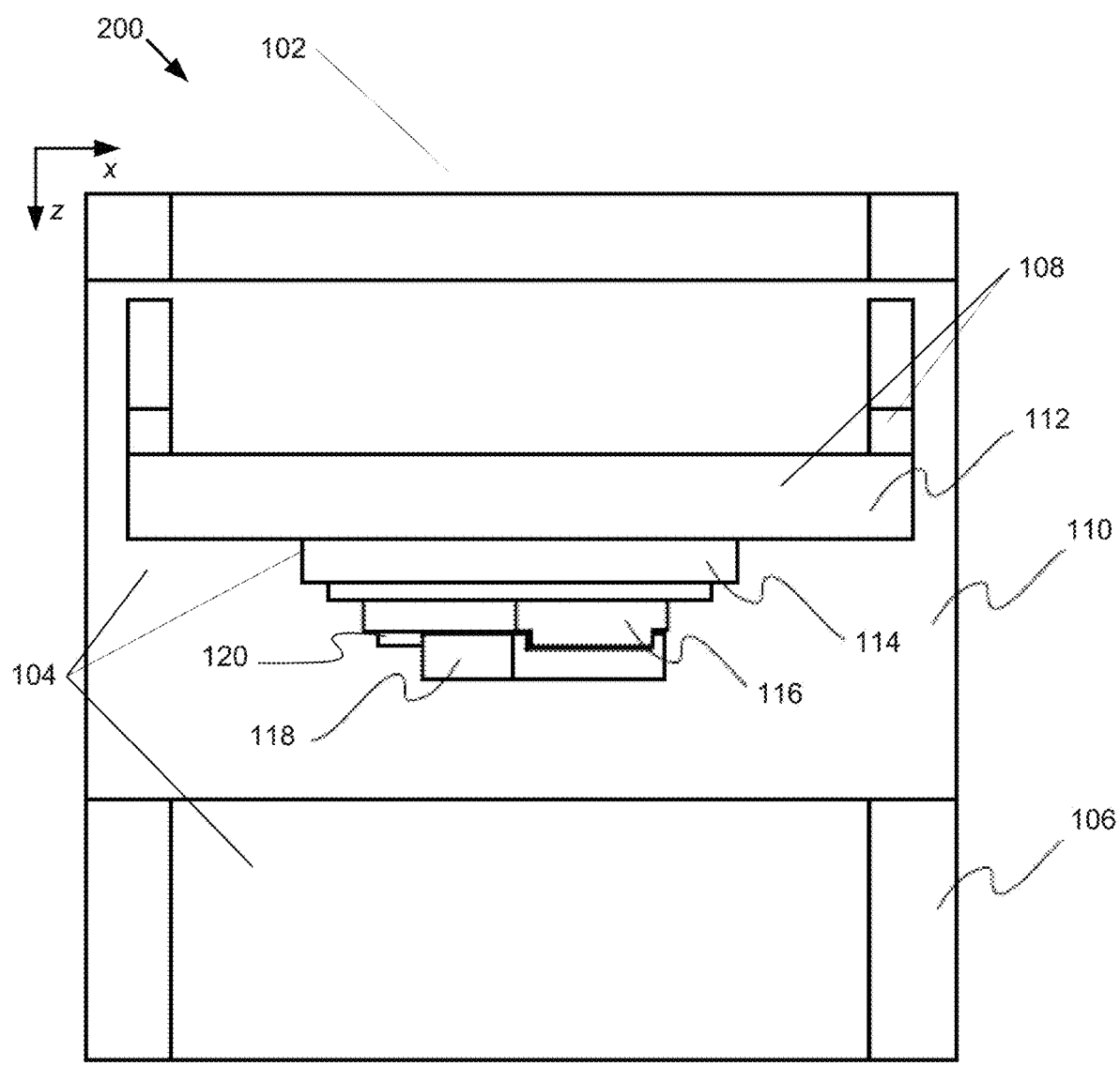
FIG. 2 illustrates a top view of the example imaging device for imaging scenes in apparent motion.
Figure 3:
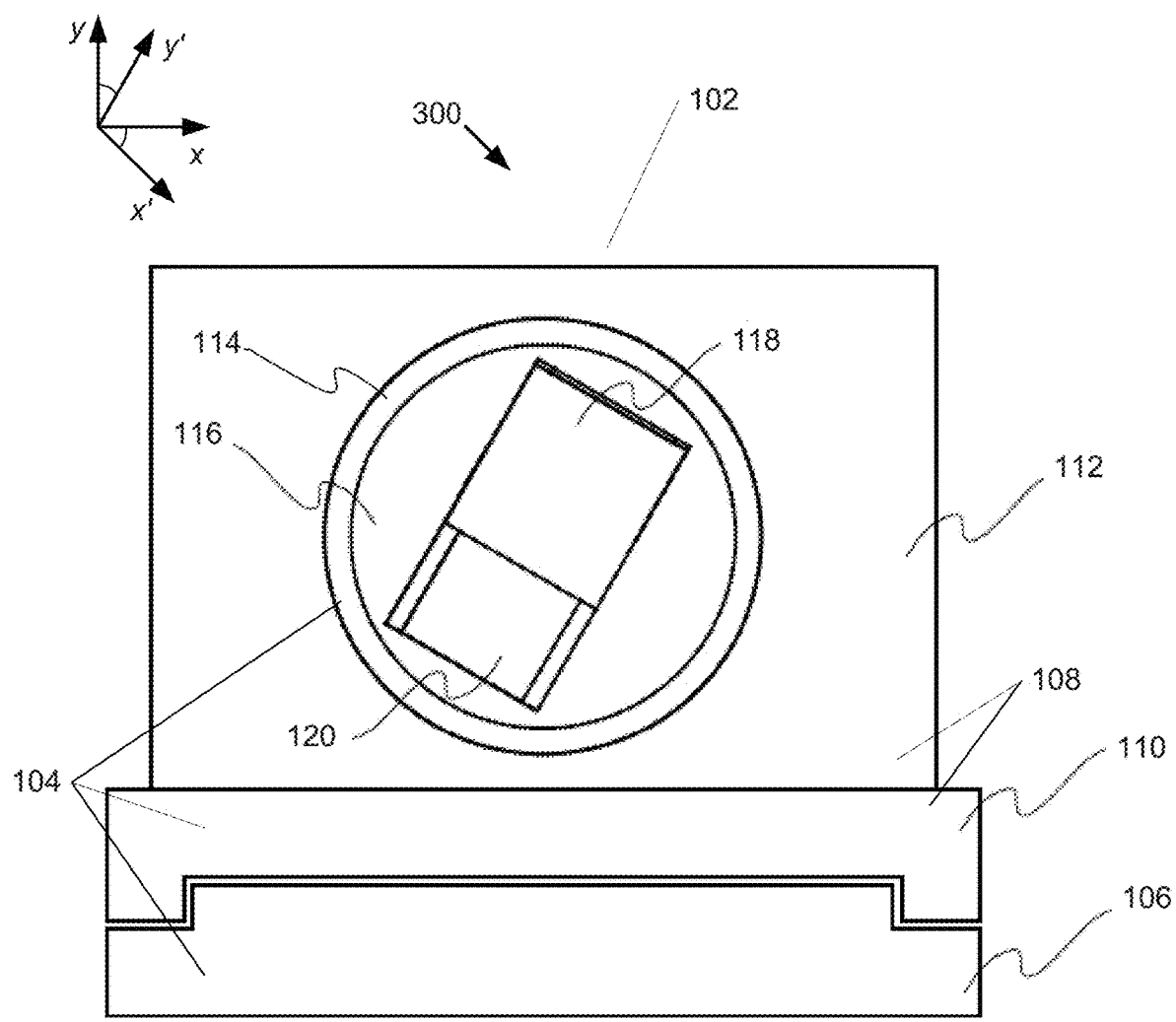
FIG. 3 illustrates a front view of the example imaging device for scenes in apparent motion.
Figure 4:
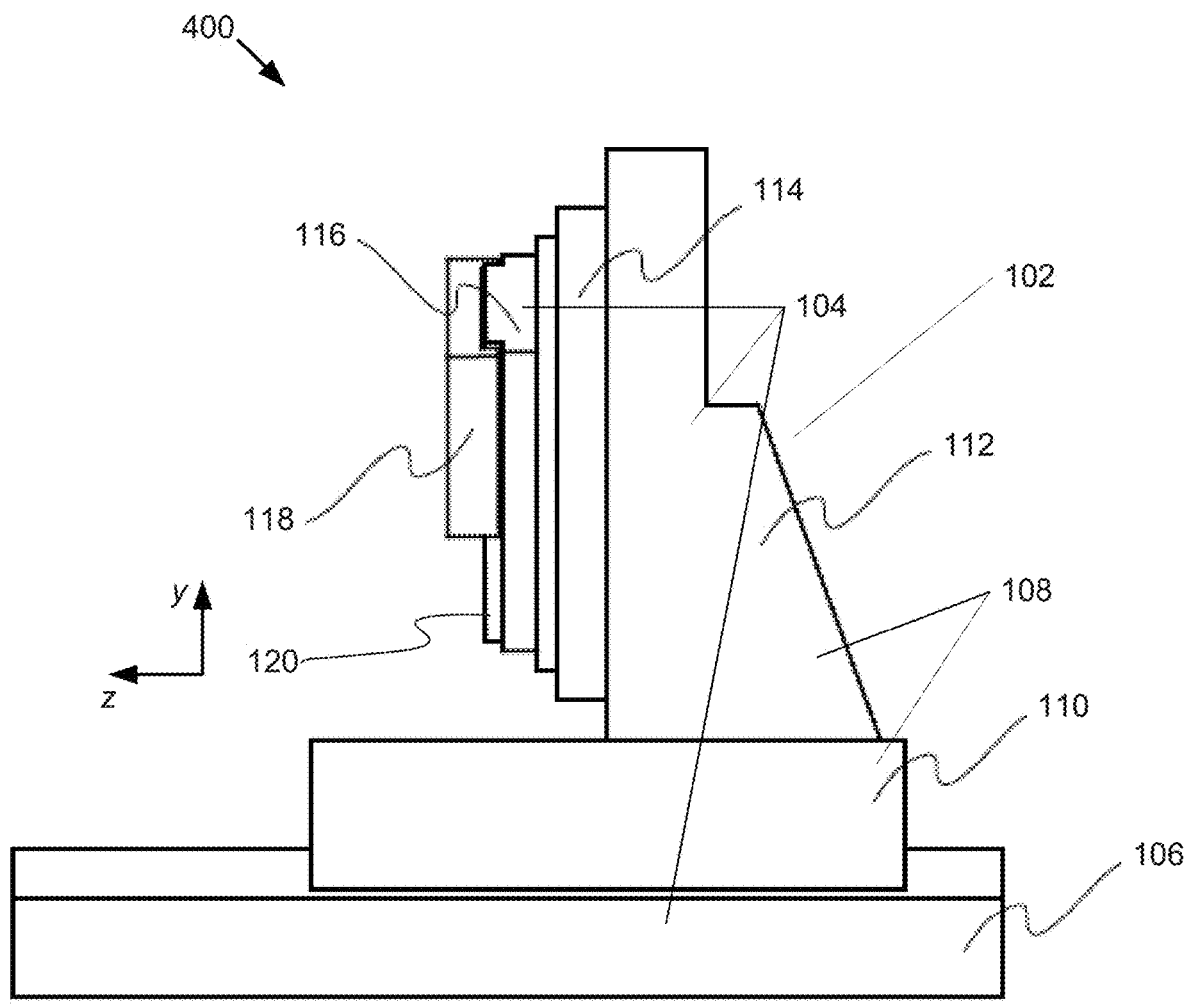
FIG. 4 illustrates a side view of an example imaging device for scenes in apparent motion.

FIG. 2 illustrates a top view 200 of the example imaging device 102 for imaging scenes in apparent motion. FIG. 3 illustrates a front view 300 of the example imaging device 102 for scenes in apparent motion. FIG. 4 illustrates a side view 400 of an example imaging device 102 for scenes in apparent motion.

In some embodiments of the imaging device 102 for use in satellites, such as in LEO satellites, the actuators are piezoelectric motors (in a variant, ultrasonic piezoelectric motors may be used instead). The rotary actuator may be a rotational motor around the z axis, used to orient the device with respect to the direction of travel. A linear motor with mechanical stabilization along the z axis may be used for focusing. The total run for the linear actuator for focusing may be enough to correct for possible variations in focus due to thermal dilation, mechanical effects, wavelength differences, etc.

Figure 5:
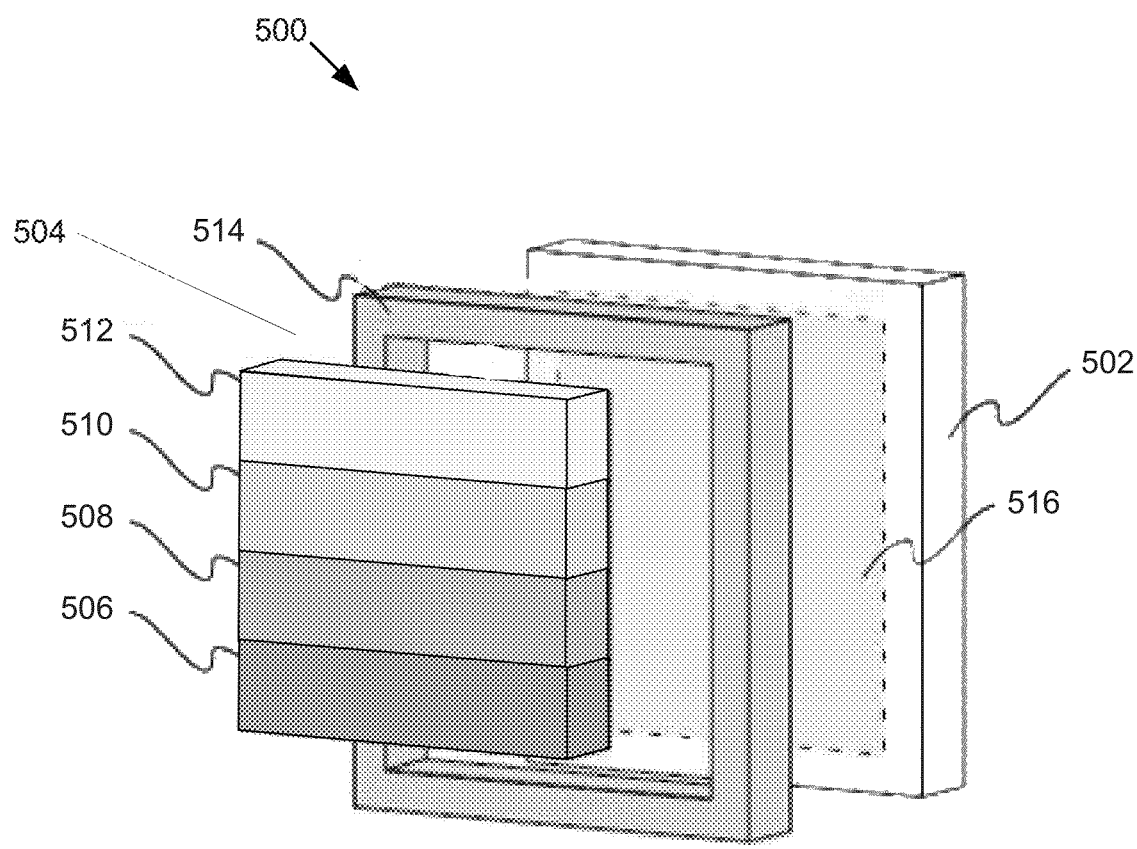
FIG. 5 illustrates an exploded view of an area imaging device and a multi-band optical filter including a plurality of filter bands for use with an imaging device for scenes in apparent motion.

FIG. 5 illustrates an exploded view 500 of an area imaging device 502 and a multi-band optical filter 504 including a plurality of filter bands 506, 508, 510, and 512 for use with an imaging device for scenes in apparent motion. Embodiments may have more or fewer filter bands than are shown in FIG. 5. A frame 514 holds the filter bands 506-512 in place, and is positioned over the AID 502.

Filter bands are selected to cover desired fractions of the electromagnetic spectrum, and embodiments are not limited to any particular band or bands. The filter bands 506-512 may include, for example, blue, infrared, green and red bands, with another band of unfiltered coverage (i.e., a panchromatic band). The number of filter bands, and the spectral transmission of each filter bands 506-512 are chosen to acquire any combination of wavelengths of interest. The filter bands 506-512 may be absorption filters, interference filters, or other kind of filters.

In some embodiments of the multi-band optical filter 504 for use in satellites, such as in LEO satellites, the filter bands 506-512 comprise five aligned bandpass filters for a set of desired sections of the electromagnetic spectrum. In one particular example, three of the filters correspond to Red, Green, and Blue (RGB) components of the visible spectrum, in order to easily compose conventional color images, with one of the remaining two bands corresponding to the whole spectrum of visible light, to get intensity information, and another of the remaining bands corresponding to near infrared. Other number and combinations of filters can be useful to gather different kinds of information whether used in satellites or other types of systems.

An active surface 516 of the AID 502 includes a plurality of pixel sensors, such as light-absorbing diodes, arranged in a two-dimensional or a three-dimensional space. The AID may be of various types, such as for example a charge coupled device (CCD), complementary metal oxide semiconductor (CMOS) sensor, or other suitable architecture.

FIG. 6 illustrates an isometric view 600 of an example imaging device 102 having an area imaging device 502 and a multi-band optical filter 504 provided thereon.

Example Operations for Imaging a Scene in Apparent Motion

FIGS. 7, 8, 10, and 12 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), in a programmable logic device, such as a field programmable gate array (FPGA), or other device. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Figure 7:
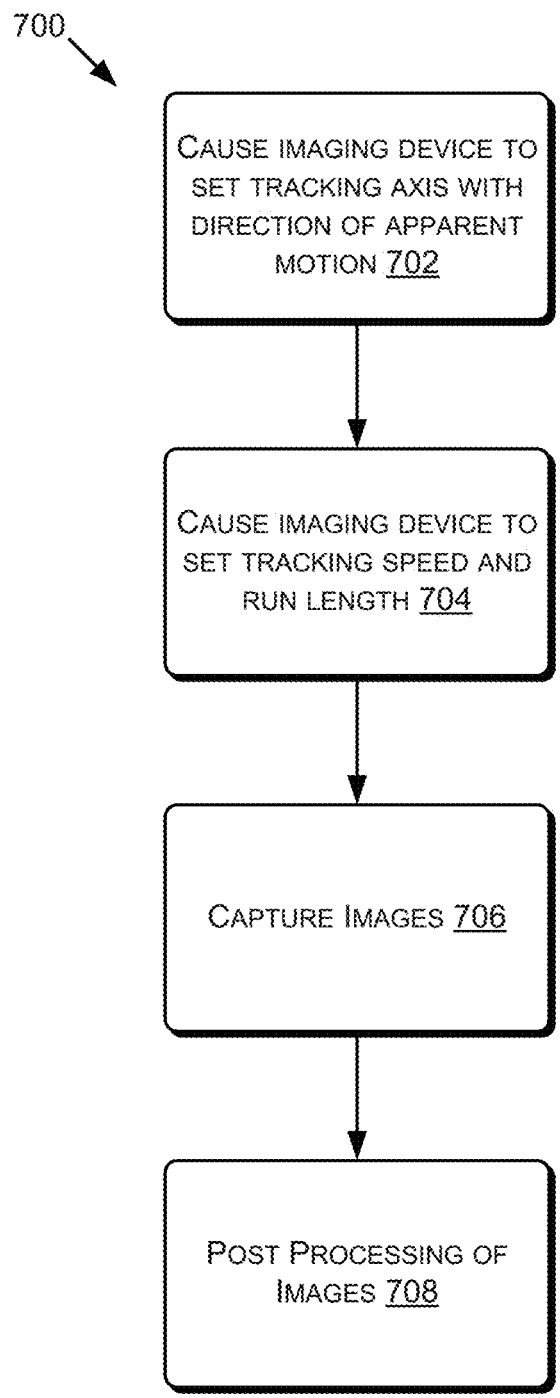
FIG. 7 is a flow diagram showing an example overview process for image capture using an imaging device for scenes in apparent motion.

FIG. 7 is a flow diagram showing an example overview process 700 for image capture using an imaging device for scenes in apparent motion. At 702, a control module of an imaging device directs a multi-axis positioning mechanism of an imaging system or apparatus to set its tracking axis to be substantially parallel with the apparent motion of a scene being imaged. In embodiments (such as in FIGS. 15A-D) where two linear actuators, an x actuator and a y actuator are simultaneously moved such that the imaging device tracks the direction of apparent motion (e.g., the tracking axis y'), the tracking axis that is set is a "virtual" tracking axis, and is implemented using the two linear actuators (x and y). In embodiments, this is accomplished using gray projections as is described in more detail elsewhere in this Detailed Description.

At 704, the control module directs the multi-axis positioning mechanism to set its tracking speed and run length based at least on the gray projections. This is accomplished such that the tracking speed causes the vertical gray projections to be less than a threshold level of displacement between at least two of the successive images as is described in more detail elsewhere within this Detailed Description.

At 706, the control system directs the imaging device to capture images, such as by directing the multi-axis positioning mechanism to move the AID along the tracking axis in one or more cycles and to direct the area imaging device to take at least one exposure during each of the one or more cycles to generate a plurality of partially overlapping exposures. This is described in more detail elsewhere within this Detailed Description.

At 708, an imaging module processes the exposures to generate an image, such as by stitching together the plurality of overlapping exposures to form an image of the scene. The processing may include utilizing multiple exposures from each cycle at different exposure times to generate high dynamic range images. The processing may include higher resolution images from multiple exposures per cycle each taken with a displacement that is not an integer multiple of a single pixel, such as sub-pixel horizontal displacements and/or sub-pixel vertical displacements as described elsewhere within this Detailed Description. Images from consecutive and partially overlapping images are stitched together. A sufficient number of exposures can be obtained to generate an image of any length.

Figure 8:
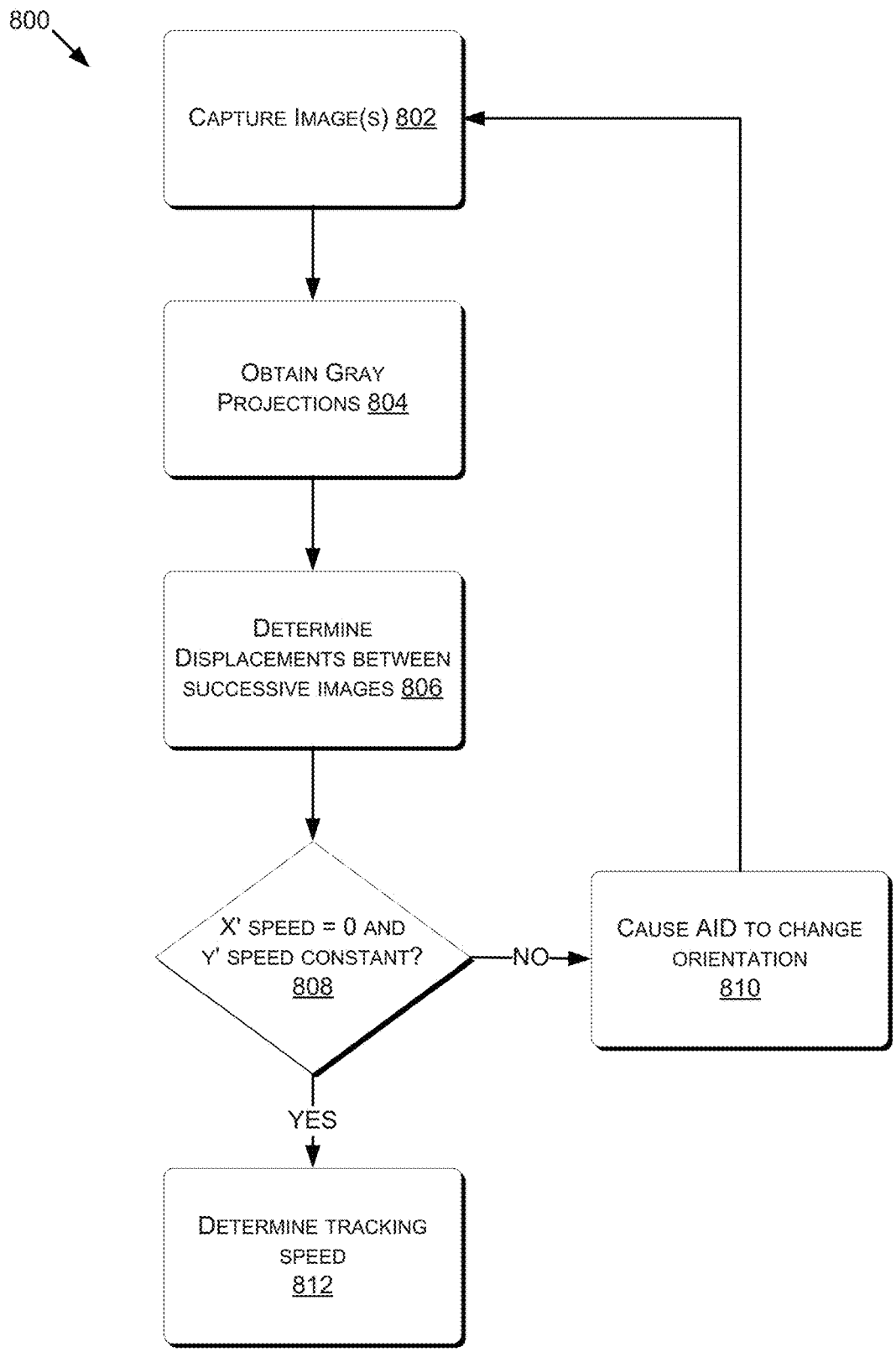
FIG. 8 is a flow diagram showing an example process for aligning a tracking axis with direction of apparent motion.

FIG. 8 is a flow diagram showing an example process 800 for aligning a tracking axis (y') with the direction of apparent motion. At 802, a control module directs the imaging device to capture two or more successive images. A "region of interest" (a partial image), and not a full-sized image of the imaging device, may be imaged at this stage, although a full-sized image may also be used. At the beginning of this process, in embodiments that utilize a rotary actuator, the rotary actuator of the multi-axis positioning mechanism is at the center of its run, and the linear actuator for tracking is also at the center of its run (e.g., a "home position") so that the center of the AID's active area is closest to the rotary actuator's rotation center. The images are taken using a short exposure time to reduce motion blur. The AID is not moved during the capture of these images that are taken during an alignment process. The frame rate is sufficiently short to reduce the portion of the scene that leaves and enters the successive frames, but long enough for there to be a suitable displacement of the scene between frames.

Figure 9:
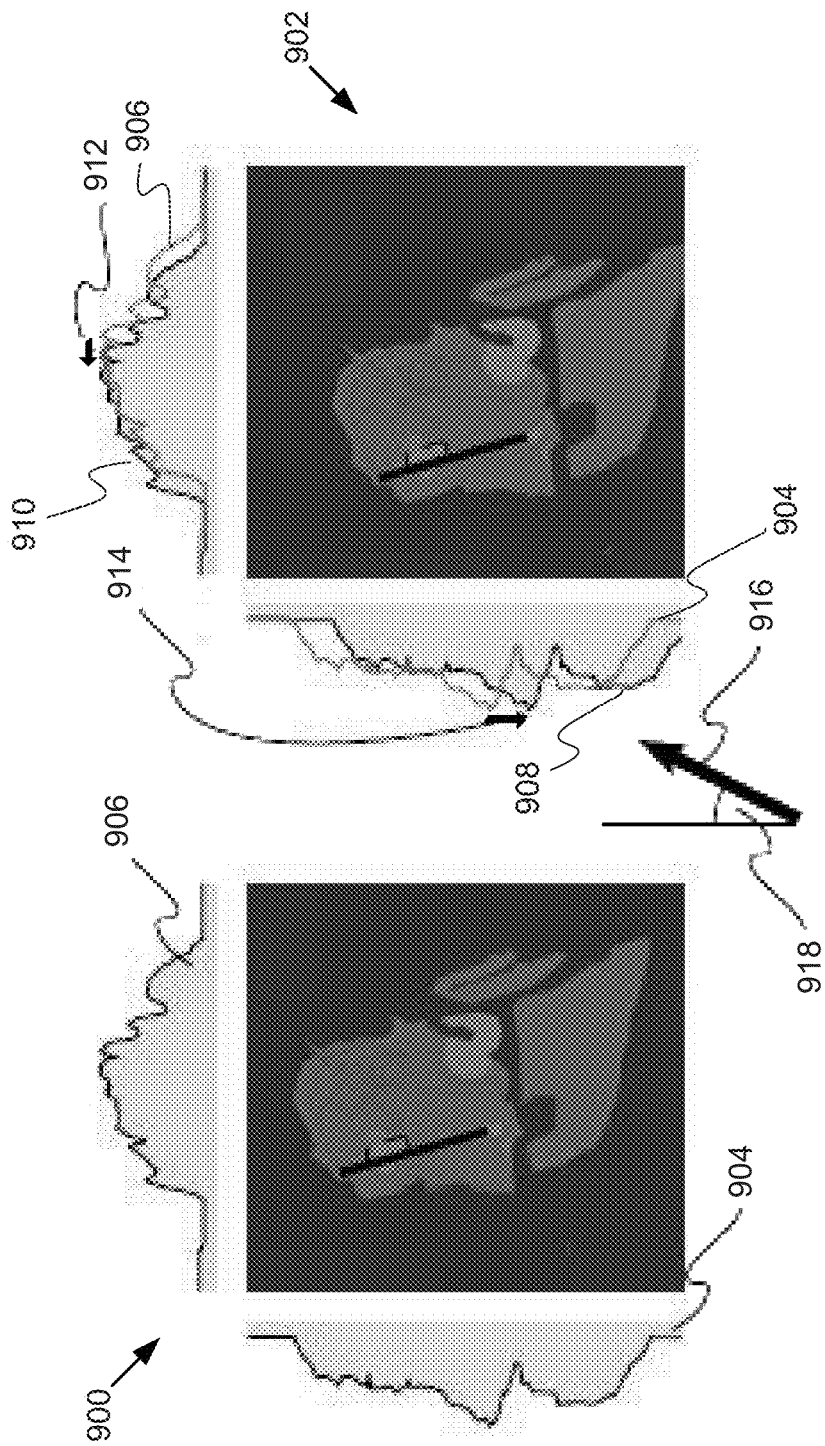
FIGS. 9A and 9B illustrate successive images and gray projections used to align an imaging device with a direction of apparent motion.

At 804, a control module obtains gray projections from the successive images (which at this stage may be partial images showing regions of interest rather than full images of the scene). In gray projections, pixel values for each column are added up to generate a vertical projection, and pixel values in each row are added up to generate a horizontal projection. These summed pixel values condense the two-dimensional image into a single row or column, and can be used to find the displacement between two images. FIGS. 9A and 9B are used to illustrate this in more detail.

At 806, the control module determines displacements between successive images. The control module calculates the displacements by correlating the gray projections of one image from the gray projections of the next successive image to compare, and then finding a peak in the correlation, as will be illustrated in more detail with respect to FIGS. 9A-B. This correlation is an expensive operation, computationally speaking. Correlation of this type could be done with the whole image rather than gray projections. Such whole-image correlation would include correlating a huge matrix of pixels, which would be especially computationally expensive. Some embodiments of the present disclosure therefore correlate using gray projections, which reduces the computational resources used to perform the function. In some embodiments, once the system is running, or based on having used some initial estimation of direction of apparent motion (e.g., from the known attitude of a aircraft or spacecraft), the system further reduces the correlation to a vicinity of the estimated displacement (instead of evaluating the full range of possible displacements). This further reduces the processing time. In the above description, "attitude" is the direction in which the imaging system is headed, defined for example by three angles with respect to some reference.

At 808, the control module determines whether the horizontal (x') displacements of the horizontal gray projections between successive images is less than a threshold level of displacement, and whether the vertical (y') displacements of the vertical gray projections between successive images is steady between the different images. Horizontal displacements being zero or within a threshold indicate that the tracking axis is substantially parallel with the direction of apparent motion of the scene.

Where at 808 the horizontal (x') displacements are not within a threshold displacement and/or where the vertical (y') displacements are not steady between images, (the "NO" arrow), the control module at 810 directs the multi-axis positioning mechanism to change alter the tracking axis, such as by changing the orientation of the AID in embodiments that utilize a rotary actuator. To do this, the control module determines whether the gray projections indicate that the scenes in the successive images move toward the bottom and left of the image, to the top and right, to the top and left, or to the bottom and right of the image. Where the scenes move toward the bottom and the left or toward the top and right, the orientation of the AID is rotated clockwise; where the scenes move toward the bottom and right or toward the top and left, the orientation of the AID is rotated counter-clockwise. To change the orientation of the AID, the control module may direct a rotary actuator to rotate the AID, or take some other action.

Where the horizontal (x') displacements are within a threshold displacement and where the vertical (y') displacements are steady between images, (the "YES" arrow), the control module at 812 determines the tracking speed of the images based on the amount of vertical displacement between the images, which is used as a starting point for determining the tracking speed of the AID, as described below with respect to FIG. 10.

FIGS. 9A and 9B illustrate successive images and gray projections used to align an imaging device with a direction of apparent motion. FIG. 9A illustrates a first image 900, and FIG. 9B illustrates a second, successive image 902 during an alignment procedure. The vertical gray projections 904 and the horizontal gray projections 906 of image 900 are determined. The vertical gray projections 908 and the horizontal gray projections 910 of image 902 are also determined. FIG. 9B shows vertical gray projections 904 overlaid with vertical gray projections 908; and horizontal gray projections 906 are shown overlaid with horizontal gray projections 910.

A horizontal displacement 912 (x') between the two images is determined based on the horizontal gray projections. A vertical displacement 914 (y') between the two images is determined based on the vertical gray projections. The control module utilizes these displacements at 808 to determine whether to further adjust the orientation of the AID. For example, the direction and movement of the imaging system with respect to the scene being imaged is along vector 916, and its angle from the vertical is angle 918. In this example, the vector 916 is not sufficiently parallel with the direction of travel (y), so the control module directs the multi-axis positioning mechanism to orient the tracking axis such that it is rotated by an angle 918; this may be accomplished by either rotating the AID where a rotary actuator is used, or by setting the speed and travel distance of two linear actuators in embodiments that utilize two linear actuators in this fashion (as in FIGS. 15A-D).

Figure 10:
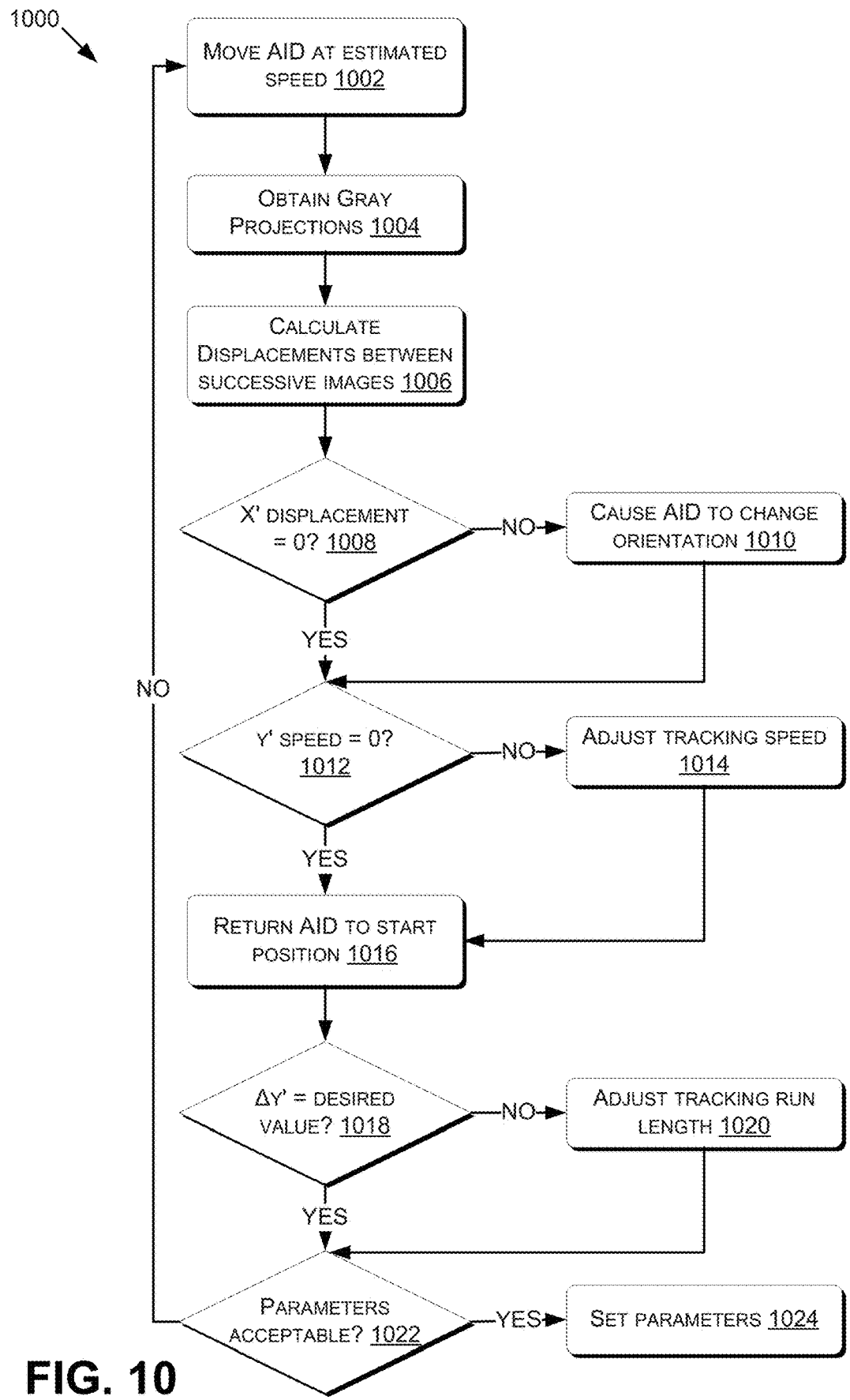
FIG. 10 is a flow diagram showing an example process for determining a tracking speed and run length of an imaging device.

FIG. 10 is a flow diagram showing an example process 1000 for determining a tracking speed and run length of an imaging system. At 1002, the control module of the imaging system directs the multi-axis positioning mechanism to move the AID at an estimated tracking speed and to return to a starting position over a plurality of cycles. The estimated tracking speed may be determined during an alignment procedure, such as at 812 of FIG. 8. The AID may be returned to the start position at a top speed of the linear actuator(s) used for tracking. The ending and starting points of the run length may be set to be at equal distances from a "home" or center position of the tracking axis (e.g., the center point along tracking rail 120) to have a suitably long usable run of the actuator during the speed adjustment procedure.

At 1004, successive images are captured and the control module determines gray projections of the successive images. Since the movement of the AID is at this point adjusted to compensate for motion during an alignment procedure (such as is illustrated in FIG. 8), the frame rate of the image capture at 1004 may be set to be longer than in the alignment phase.

At 1006, the control module determines vertical and horizontal gray projection displacements, in the same or similar way as is discussed above with respect to FIG. 8.

At 1008, the control module determines based on the horizontal gray projections of successive images whether the horizontal displacements (x') (or speed of horizontal displacements) are zero or within a threshold displacement between successive images.

If the horizontal displacements are not within the threshold (the "NO" arrow), the control module at 1010 changes the orientation of the tracking axis, such as by directing the AID to change orientation where a rotary actuator is utilized, similar to the procedure described with respect to 810 of FIG. 8, such as by directing a rotary actuator to rotate. Where two linear actuators are utilized (such as in FIGS. 15A-D), the tracking axis is re-oriented by setting new speed and travel distances for the two linear actuators. This fine-tunes the orientation of the AID.

At 1012, the control module determines based on the vertical gray projections of successive images, whether the vertical speed (or vertical displacements) of the successive images is zero or within a threshold speed between successive images. If the vertical speeds are not within the threshold (the "NO" arrow), then the control module at 1014 directs the AID to change the speed of the linear actuator(s) used for tracking to compensate for the apparent motion.

At 1016, the control module returns the AID to its start position for the next cycle. At 1018, the control module determines from the vertical gray projections whether the vertical displacement (Δy') is at a desired value between successive images. In embodiments, the control module determines this by measuring, calculating, or otherwise determining the cycle time (e.g., the time from the start of movement of the AID from the start position along the run length to a time when the AID is moved back to the start position), and the tracking speed is multiplied by the cycle time to determine the vertical displacement between cycles. The vertical displacement is compared to a desired displacement. In embodiments, the desired displacement is based on the length of a single band of the multi-band optical filter minus a desired overlap between exposures taken in successive cycles.

If the vertical displacements (Δy') are not at acceptable values between successive images (the "NO" arrow), then the control module at 1020 directs the imaging device to adjust the run length of the AID. The run length is adjusted such that the overlap between exposures taken in successive cycles is within a predetermined displacement range, such as a predetermined range of pixels (e.g., 300 pixels or other number of pixels).

At 1022, the control module determines whether the parameters are acceptable for imaging. The parameters include the vertical displacements (Δy'), the horizontal displacements (Δx'), and the vertical speed determined from exposures taken in successive cycles, as discussed above.

If the parameters are not at acceptable values (the "NO" arrow), then the control module repeats the process until the parameters are acceptable (or until a threshold number of imaging cycles has been accomplished). If the parameters are at acceptable values (the "YES" arrow), then the control module at 1024 sets the parameters for imaging, which are subsequently used during an imaging phase, such as is described with respect to FIG. 12.

FIGS. 11A-C illustrate successive images 1100, 1102, and 1104, respectively, and associated gray projections that are used to determine a speed of travel and a run length of the imaging device. The images 1100, 1102, and 1104 are taken while the AID is moved along its run length in successive cycles. The control module determines vertical gray projections 1106 and horizontal gray projections 1108 of image 1100, as well as vertical gray projections 1110 and horizontal gray projections 1112 of image 1100. FIG. 11B shows vertical gray projections 1106 overlaying vertical gray projections 1110, and horizontal gray projections 1108 overlaying horizontal gray projections 1112. In the example illustrated in FIGS. 11A-B, there is no horizontal displacement (Δx') as the orientation of the imaging device has been changed to compensate for the direction of apparent motion of the scene being imaged. (Referring back to FIG. 10, this determination is made at 1008).

In the example illustrated in FIGS. 11A-B, there is a small amount of vertical displacement 1114 between the successive images. The control module therefore adjusts the tracking speed to compensate for the speed of apparent motion. (Referring back to FIG. 10, this determination is made at 1012 and the adjustment is made at 1014).

In the example illustrated in FIG. 11C, a third successive image 1104 is shown with its vertical gray projections 1116 overlaid with vertical gray projections 1110 of image 1102, and with its horizontal gray projections 1118 overlaid with horizontal gray projections 1112 of image 1102. If it the vertical displacement 1120 is greater than or less than a desired range of pixels (300 pixels, for example), then the tracking run length is adjusted and further gray projections are obtained to test the displacement. (Referring back to FIG. 10, this determination is made at 1018 and the adjustment is made at 1020).

Figure 12:
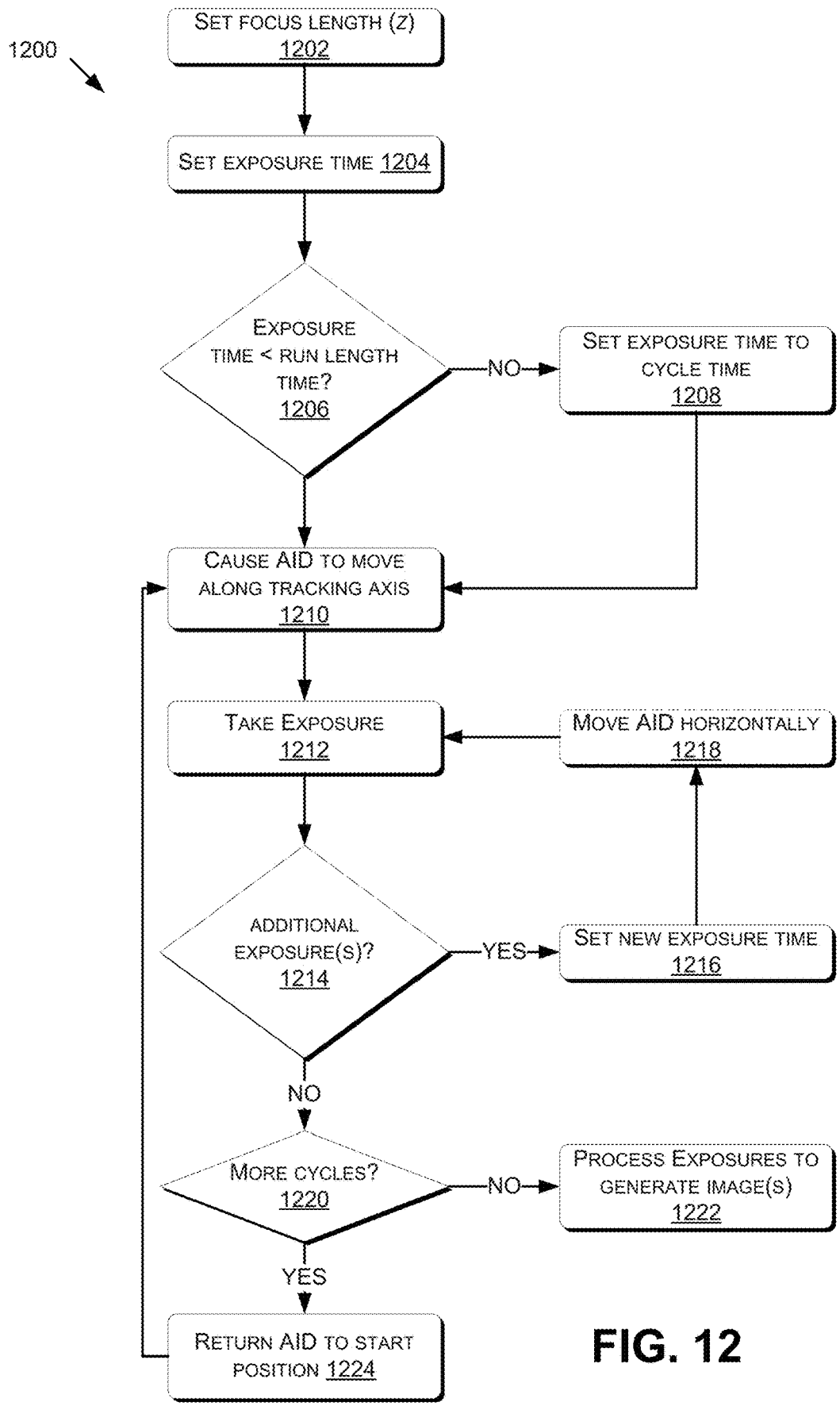
FIG. 12 is a flow diagram showing an example process for imaging a scene that is in apparent motion according to embodiments.

FIG. 12 is a flow diagram showing an example process 1200 for imaging a scene that is in apparent motion according to embodiments. At 1202, the control module of the imaging device controls the multi-axis positioning mechanism to set the distance from the optics to the imaging device (z) in order to focus the image. The control module may operate a linear actuator to set the focus length of the imaging device.

At 1204, the control module sets one or more exposure times for each cycle, taking into account that different ones of the optical filter bands of the multi-band optical filter permit differing amounts of light to pass through. Taking images with different exposure times also allows the system to perform high dynamic range imaging (e.g., combining several images taking with different parameters into a single image). For example, if the scene being imaged is over-illuminated in one portion and under-illuminated in another portion, then the imaging system may combine two or more images taken at different exposure times to generate an image that appears to be properly illuminated, or more evenly illuminated, at all portions.

At 1206, the control module determines whether the exposure time calculated at 1204 is less than a time of the run length of the imaging device (e.g., the cycle time minus the time it takes for the multi-axis positioning mechanism to return the AID to the start position). The cycle time is the amount of time that it takes for the multi-axis positioning mechanism to move the AID from a start position to an end position along a run length, and then return the AID to the start position. Therefore, the cycle time depends on the tracking speed, the run length, and the speed that the multi-axis positioning mechanism is configured to return the AID to the start position. At least the tracking speed and the run length are determined previously, such as is described with respect to FIG. 10.

Where the exposure time is not less than the time of the run length (the "NO" arrow), the control module at 1208 sets the exposure time to be less than or equal to the cycle time minus the time it takes for the multi-axis positioning mechanism to return the AID to the start position.

At 1210, the control module directs the multi-axis positioning mechanism to move along the tracking axis at the tracking speed and run length, such as by controlling a linear actuator for tracking. This begins a cycle.

At 1212, the control module directs the AID to take an exposure for an exposure time determined at 1204 or at 1208. The resulting image data from each filter band is saved. At 1214 the control module determines whether the cycle time permits, and/or whether the operational parameters for the imaging job specify, additional exposures to be taken during the current cycle.

Where permitted and specified (the "YES" arrow), at 1216 the control module sets a new exposure time. Where the additional exposures are to be used to generate a high dynamic range (HDR) image, the exposure time set at 1216 may be different, either longer or shorter, than the exposure time determined at 1204. For example, the second exposure time may be twice as long as the exposure time determined at 1204. The exposure time may be set to be the same as or different from the exposure time determined at 1204.

At 1218, where the additional exposures are for generating a high-resolution image based on horizontal or vertical displacements between successive images that are not an integer multiple of a single pixel, the control module directs the multi-axis positioning mechanism to position the AID to be horizontally or vertically offset. Such horizontal or vertical displacements may be sub-pixel displacements, as well as displacements that are larger than single pixels, so long as such displacements are not exactly a multiple integer of a single pixel, such as a displacement of 7.5 pixels or other non-integer displacement. Horizontally offset positions may be obtained by moving the AID along a transverse axis that is perpendicular to the tracking axis by a distance, such as less than the distance between two adjacent or neighboring pixels of the AID or some other non-integer multiple of the distance between two pixels. Vertically offset positions may be obtained by causing the AID to begin a successive exposure at a position that is offset by a sub-pixel distance or other non-integer length between two neighboring pixels from the initial position of a previous exposure. Either one or both of horizontally displaced exposures and vertically displaced exposures (or exposures that are both horizontally and vertically displaced) relative to an initial exposure may be obtained in order to provide relatively higher resolution images.

Where additional exposures are not specified, or where additional exposures are not permitted by the remaining time during the current cycle (the "NO" arrow), at 1220 the control module of the imaging system determines whether there are additional cycles remaining in the current imaging job. The number of cycles is determined based on various factors, including the number of bands in the multi-band optical filter, the desired size of the image, and the amount of overlap specified between successive exposure cycles.

Where more cycles are to be performed (the "YES" arrow), at 1224 the control module directs the multi-axis positioning mechanism to return the AID to the start position. The next cycle is performed, with one or more additional exposures captured during each subsequent cycle.

At 1222, once all cycles are completed (the "NO" arrow), an imaging module of the imaging system processes one or more exposures to generate an image or video frame. To obtain HDR images, the imaging module applies a tone mapping algorithm to exposures, such as exposures taken during the same cycle with different exposure times. To generate a high-resolution image, the imaging module applies a resolution enhancement algorithm to exposures taken during the same cycle with vertical or horizontal displacements from one another of non-integer multiples of the distance between two pixels. Where more than one cycle is utilized, images from consecutive cycles are stitched together to obtain images with arbitrary length. Since all bands of the multi-band optical filter are used to image the same scene, but vertically displaced from one another, the stitching mechanism is used in some embodiments to align the pictures from each band to obtain a multi-spectral image.

A suitable stitching algorithm locates matching features in each image (from different cycles), determines the displacement and rotation of those features between successive images, applies the displacement and rotation to the full image, and blends both images where they overlap. In embodiments of the present disclosure, the displacement is known a priori, and is based on the length of the bands of the multi-band optical filter minus the desired overlap. Also, no rotation is expected due to having previously aligned the tracking direction of the multi-axis positioning mechanism with the direction of apparent motion. Some embodiments of the present disclosure may be based on an assumption that rotation is zero, and assume a constant overlap, which simplifies the computational complexity of the stitching algorithm, which may reduce the power consumption and computational requirements of the devices to be used to perform the stitching algorithm. Also, because the tracking direction and speed of the linear actuator for tracking are set to compensate for the apparent motion of the scene to be imaged, no or reduced post-processing is used in some embodiments to eliminate blur, further reducing the computational complexity and power consumed during processing, (although such post-processing to reduce blur may be used without departing from the scope of embodiments).

For panchromatic video, two modes are available. In a first, if the desired duration of the video is shorter than the duration of a single tracking motion, the video can be obtained by taking multiple images while the tracking is active. The size of the resulting video will be that of the panchromatic strip. Where the tracking cycle is very short, multi-spectral images are taken as described above, and each multi-spectral image is used as a single frame of the video. The imaging apparatus may need to be rotated to compensate for rotations of the scene being video recorded when the scene is longer than the run length(s) of the linear actuator(s) used for tracking.

During the imaging process 1200, a fine-tuning of the tracking axis and the tracking speed is performed using gray projections, similar to or the same as elements 1008, 1010, 1012, and 1014 in FIG. 10. This may help correct residual yaw motion of the satellite (in embodiments employing the imaging system in a satellite-based system).

Figure 13:
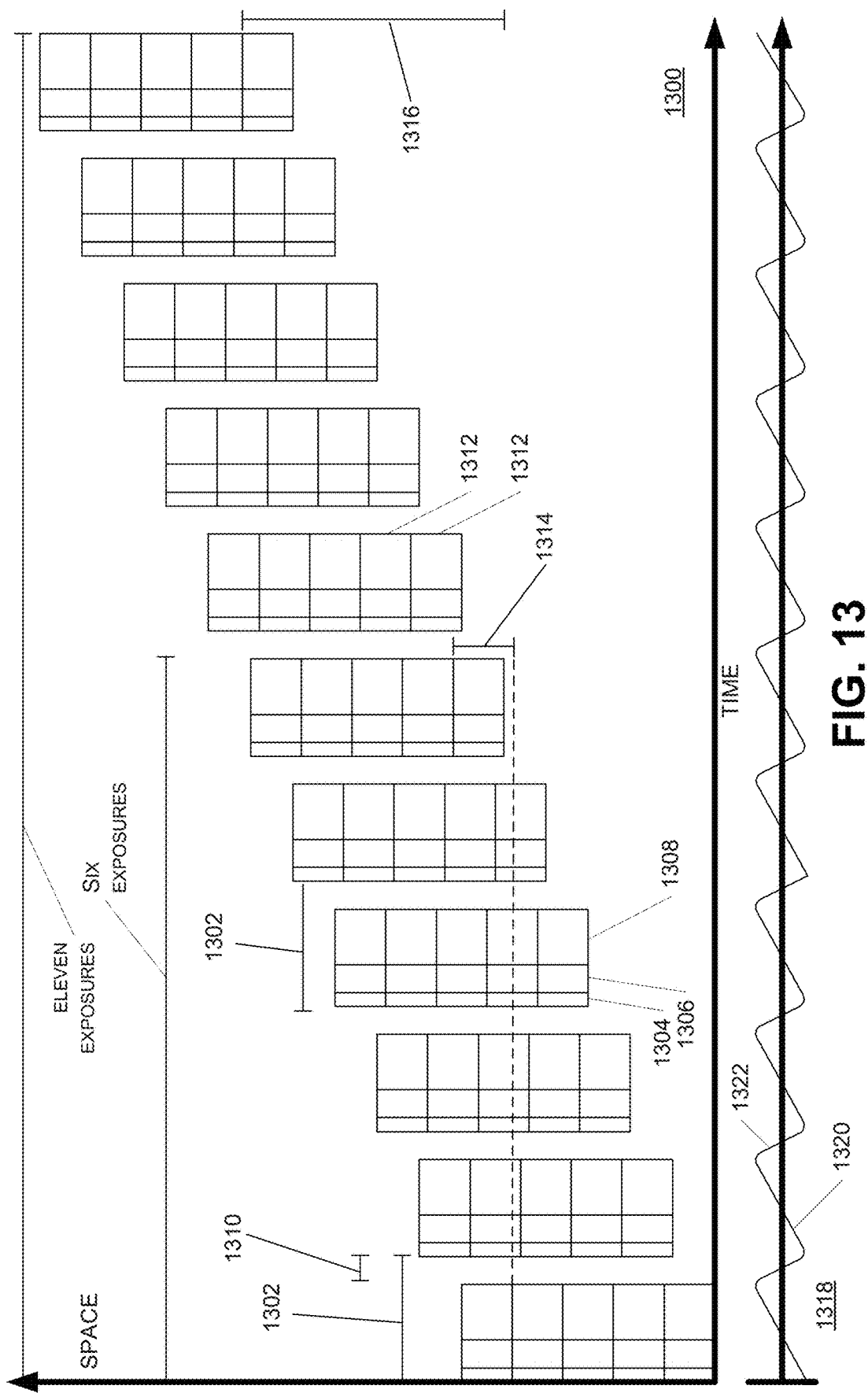
FIG. 13 is a graph of exposures taken, plotted against time and space during the operation of the device during an image capture phase.

FIG. 13 is a graph 1300 of exposures taken, plotted against time and space during the operation of the device during an image capture phase. In the example illustrated in FIG. 13, a series of cycles 1302 result in multiple exposures. Within each cycle 1302, three exposures 1304, 1306, and 1308 are made. Because the AID is moved at a speed and direction that compensates for the direction and speed of apparent motion of the scene being imaged, each exposure 1304, 1306, and 1308 is of the same scene, with no displacements between them even though they occur at different times. At the end of each cycle, the AID is returned to the start position, during a time segment 1310, at which point the next cycle begins. The exposures taken in successive cycles are offset from one another by an amount previously determined. Each horizontal image band 1312 from each cycle 1302 represents the image bands corresponding to different ones of the optical filter bands of the multi-optic filter positioned over the AID. Each successive cycle results in exposures for which a segment of the image is exposed through a different one of the filter bands. In the example illustrated in FIG. 13, five bands are present for each exposure (which may correspond to four filter bands on the multi-band optical filter plus one non-filtered band). In the example illustrated in FIG. 13, portions of image 1314 have been exposed through all five filter bands. Because there is a slight offset between successive exposures, it takes more than five cycles to fully image the single band image 1314 through all filter bands. After six cycles, a single band image 1314 equal to the size of a single band may be stitched together. After eleven cycles, a multi-band full image 1316 equal to the active area of the AID may be stitched together. Using more cycles, it is possible to compose an image stripe of arbitrary length. Longer image strips may utilize more storage, additional transmission time or bandwidth, higher compression rates, etc.

Graph 1318 graphs the motion of the linear actuator for tracking, or the AID, over the multiple cycles. In a first portion 1320, the AID is moved forward along the tracking axis at the tracking speed, and in a second portion 1322 then is returned to the start position at a speed which may be higher than the tracking speed.

Example for Use in LEO Satellite Imaging

The orbit of a LEO satellite may be, for example, 700 km high in a typical situation. At this altitude, the orbital period is 98 minutes and 37 seconds and the projected velocity on the ground is 6764 m/s. A telescope may be a Cassegrain with an aperture diameter of 30 cm and a focal length of 2.5 m. Thus, each meter on the ground will be projected as a 3.6 µm image on the focal plane, and will be moving at 24.2 mm/s. The linear actuator for tracking is able to move at least at this velocity in order to compensate for the movement of the image. The maximum speed of the linear actuator for tracking may be several times higher in order to reduce the time it takes to return the linear actuator for tracking to the start position. Finally, if the camera has five filter bands and 2000×2000 pixels, each 5 µm in width, and the desired overlap between images is 100 pixels, then the run length of the linear actuator for tracking may be 1.2 mm. Each cycle will take approximately 50 ms. An approximate photometric analysis shows that exposure times would be around 10 ms in order for there to be sufficient time to take several exposures during each cycle. This can be used, as explained before, to obtain HDR and/or higher resolution images.

In this example, the cycle time can be calculated for two opposite extreme conditions. In a first extreme condition, a satellite is at the lowest LEO orbit (160 km), and has a telescope with 4 m of focal length. The cycle time will be approximately 20 ms. Providing a cycle time of 20 ms is well within the capabilities of available hardware and software components, including electronics, motors, other mechanical parts, and software, that would be reasonably suitable for implementing imaging systems as described herein, such as imaging systems onboard aircraft and spacecraft. An aperture of no more than 50 cm is needed.

In a second extreme condition, a satellite is at the highest LEO orbit (2000 km) and has a telescope with 1.5 m focal length. Its cycle time will be approximately 1 second. Even with an aperture as small as 10 cm, the exposure times are several times smaller than the cycle time. This is also well within the capabilities of available components.

Example Imaging System

Figure 14:
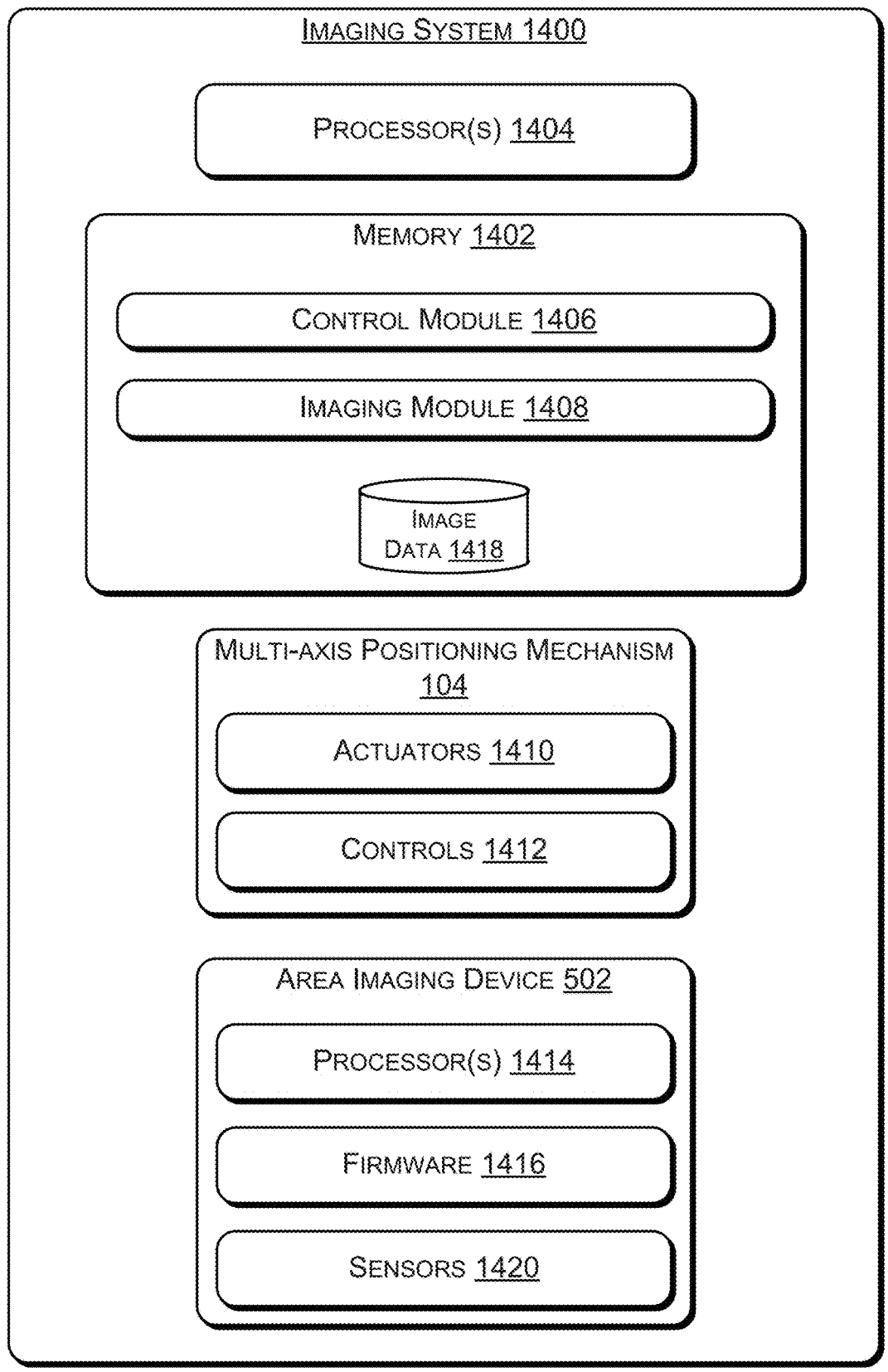
FIG. 14 is a block diagram of an example imaging system usable to image scene having apparent motion.

FIG. 14 is a block diagram of an example imaging system 1400 usable to image scene having apparent motion. The imaging system 1400 may be all or partially on-board an aircraft or spacecraft, such as the satellite 122, such as a LEO satellite. In some embodiments, some of the components of the imaging system 1400 may be ground-based or on-board a separate aircraft or spacecraft, with such ground-based or separate aircraft or spacecraft in communication with the system that includes the actual optics systems (the telescope, the multi-axis positioning mechanism 104 and the AID 502, among other things). The imaging system 1400 is configured as any suitable computing device or system. Memory 1402 may store program instructions and program modules that are loadable and executable on one or more processor(s) 1404, as well as data generated during execution of, and/or usable in conjunction with, these programs, such as image data, images, and so forth.

Memory 1402 includes at least a control module 1406 and an imaging module 1408. The control module may perform some or all of the control functions associated with capturing images in accordance with embodiments of the present disclosure. The control module 1406 is executable by the one or more processors to control, such as through one or more input/output interfaces, the multi-axis positioning mechanism 104, including controlling the actuators 1410 through one or more electronic controls 1412 (such as controllers, which may in turn operate actuators 1410 through one or more limit switches, checks, closed loop actuator controls, and so forth) to move, position, or otherwise manipulate various mechanical aspects of the multi-axis positioning mechanism 104. The actuators 1410 include for example a linear actuator for focusing, a rotary actuator, a linear actuator for tracking, a sub-pixel transverse actuator, and other actuators and variations thereof according to various embodiments of the present disclosure.

The control module 1406 is executable by the one or more processors 1404 to control, such as through one or more input/output interfaces, the AID 502. The AID 502 may be controlled to capture one or more exposures, such as synchronized with the control of the multi-axis positioning mechanism 104 to capture exposures while the AID is moved to compensate for the apparent motion of a scene being imaged according to various embodiments of the present disclosure.

The area imaging device 502 may include one or more processors 1414 and firmware 1416 (stored on a suitable, non-transitory computer-readable storage medium) to perform or otherwise control various functions of the AID 502. The firmware 1416 may be executable by the one or more processors 1414 to control exposure times, time the exposure capture, determine gray projections, store image data 1418 on the memory 1402, and so forth.

The AID 502 also includes light-sensitive sensors 1420, such as for example semiconductor components suitable to implement a charge coupled device (CCD), a complementary metal oxide semiconductor (CMOS) sensor, or other suitable sensor architecture on the active surface 516 of the AID 502.

The imaging module 1408 performs various image processing functions of the imaging system 1400, including tone mapping to generate HDR images, a resolution enhancement algorithm to produce high-resolution images, and a stitching algorithm to generate images from multiple partially overlapping exposures, as well as other processing functions, such as blur removal, artifact removal, color enhancement, cropping, image conversion, image compression, data encryption, and so forth.

In embodiments, the firmware 1416 of the AID 502 may be considered as an extension of one or both of the control module 1406 and the imaging module 1408, with some or all of the functions of the control module 1406 and/or the imaging module 1408 performed on or by the firmware 1416, executing on the one or more processors 1414. In some embodiments, some or all of the functions of the control module 1406, the imaging module 1408, and/or other functions of the firmware 1416 may be implemented as logic functions on the one or more processors 1404. For example, in some embodiments, the one or more processors 1404 may include an application-specific integrated circuit (ASIC), a programmable logic device, such as a field programmable gate array (FPGA), or other logic circuit to perform various functions, including various control functions of the control module 1406 and/or the image processing functions of the imaging module 1408.

Computer-Readable Media

Depending on the configuration and type of computing device used, memory 1402 of the imaging system 1400 in FIG. 14 as well as the media for storing firmware 1416 in the AID 502, may include volatile memory (such as random access memory (RAM)) and/or non-volatile memory (such as read-only memory (ROM), flash memory, etc.). Memory 1402 as well as the media for storing firmware 1416 in the AID 502, may also include additional removable storage and/or non-removable storage including, but not limited to, flash memory, magnetic storage and/or optical storage, and/or tape storage that may provide non-volatile storage of computer-readable instructions, data structures, program modules, and other data for imaging system 1400.

Memory 1402, as well as the media for storing firmware 1416 in the AID 502, is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Further Examples

Figure 15A:
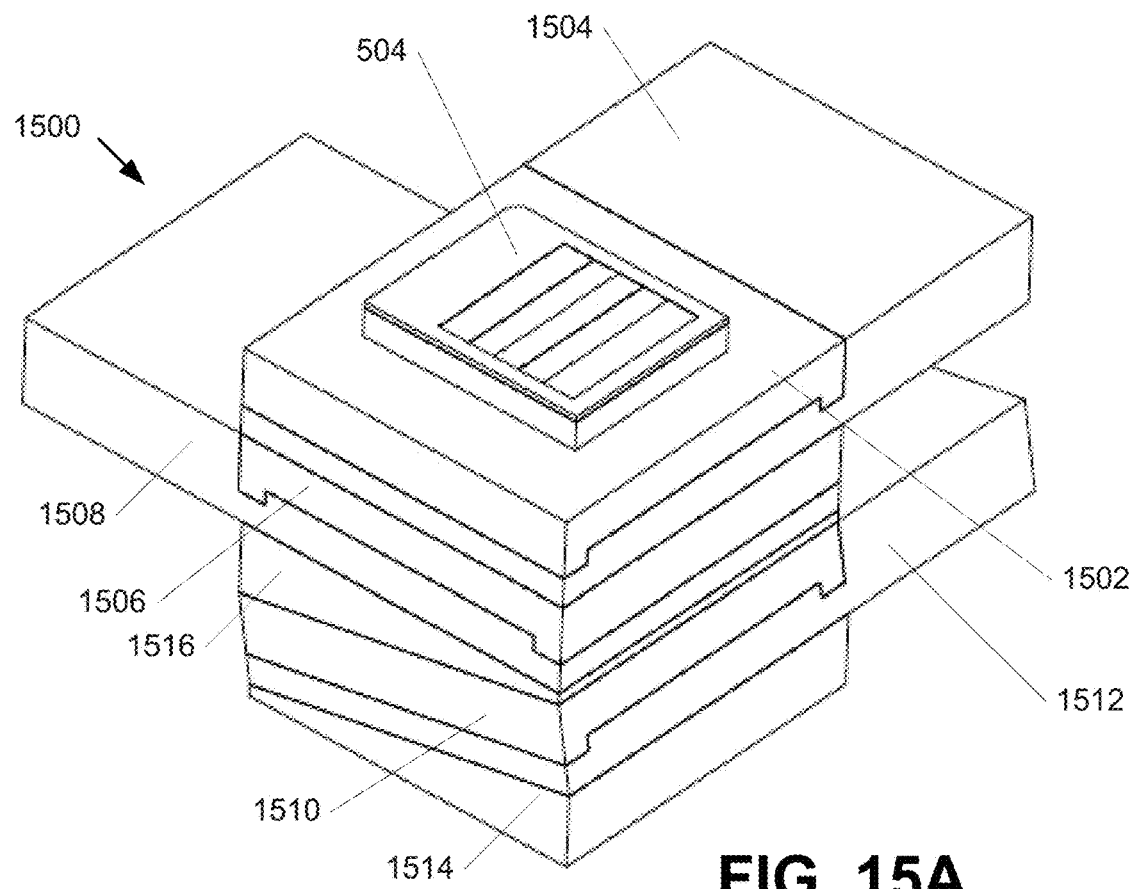
FIGS. 15A-D illustrate isometric views and side views of an example imaging device having a multi-axis positioning mechanism with multiple linear axes rather than a linear axis a rotational axis.
Figure 15B:
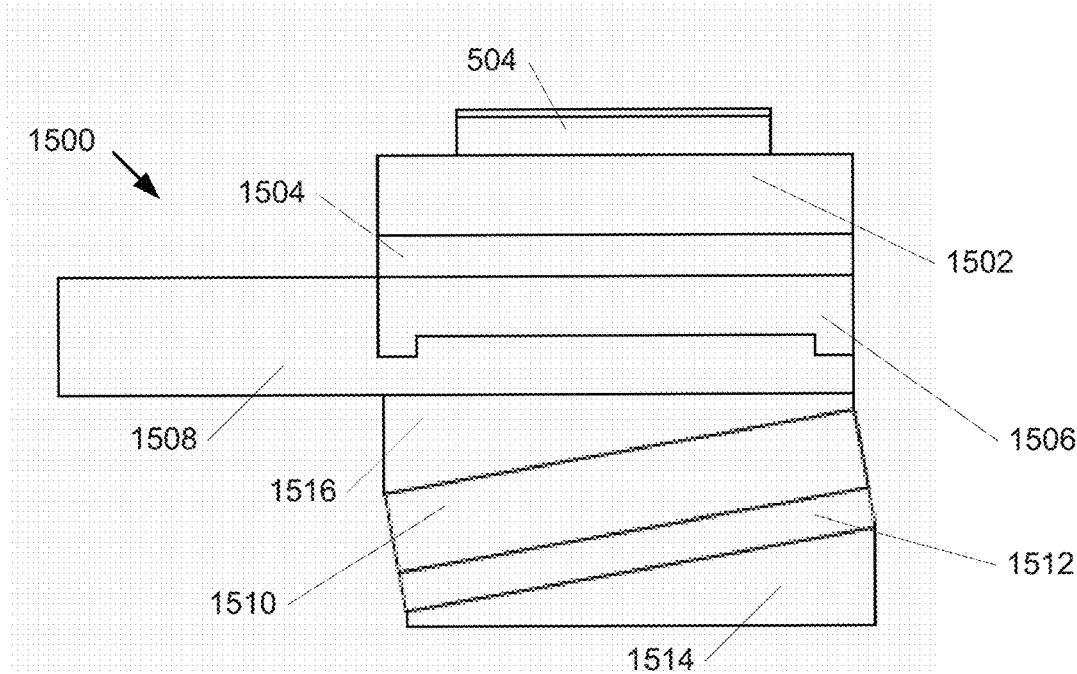

FIGS. 15A-D illustrate isometric views and side views of an example multi-axis positioning mechanism 1500 having a multi-axis positioning mechanism with multiple linear axis for tracking the imaging device. The imaging device 1500 is shown with the AID 504 disposed thereon, although a different image capture device besides the AID 504 may be used without departing from the scope of embodiments. FIG. 15A illustrates an isometric view, and FIG. 15B illustrates a side view, of the imaging device 1500 in a first configuration. The AID 504 is disposed on a sliding platform 1502, and the sliding platform 1502 is situated upon a rail part 1504. The rail part 1504 is itself situated on a sliding platform 1506, which is situated on a rail part 1508. The rail part 1508 is situated on a wedge 1516, which is situated on a sliding platform 1510. The sliding platform 1510 is situated on a rail part 1512. The rail part 1512 is situated on a wedge 1514. Linear actuators control the sliding of the sliding platforms 1502, 1506, and 1510 along rail parts 1504, 1508, and 1512, respectively.

In the position illustrated in FIG. 1, rail parts 1504 and 1512 are aligned on the same axis, and can be considered to be aligned along an x axis. The rail part 1508 is perpendicular to rail parts 1504 and 1512, and can be considered to be aligned along the y axis.

The topmost rail part 1504 and its corresponding actuator is aligned with the direction of the apparent motion (such as by adjusting the orientation of the spacecraft or aircraft), with some relaxed tolerance (e.g., 5° to 10° or some other ranges of degree of tolerance). The actuators attached to the topmost rail part 1504 and to the middle rail part 1508 both are controlled by a control module (such as the control module 1406) together to compose a movement (and speed) in the direction of the apparent movement of the target scene, e.g., along the tracking axis y'. The control module 1406 controls the movement of the AID 504 using the topmost actuator and the middle actuator coupled to the topmost rail part 1504 and the middle rail part 1508, respectively, to move the platforms 1502 and 1506. The control module causes the AID 504 to move through one or more cycles as in previously discussed embodiments (such as those discussed in FIGS. 1-6). The same or similar procedures as discussed in FIGS. 7-12 are utilized with the imaging device 1500 to align the tracking axis, determine the speed of movement of each actuator, generate one or more exposures through one or more cycles, and generate images as discussed above.

The bottom rail part 1512 and its corresponding actuator are controlled by the control module to focus the actuator. The bottom rail part 1512 is positioned on the wedge 1514 (with an angle), hence its movement will produce a displacement of the AID 504 in both the x and z directions, with the movement in the z direction for purpose of focusing, in some embodiments. The movement in the x direction may be compensated by moving the x stage (e.g., the topmost platform 1502 along the topmost rail part 1504). A second wedge 1516 is used to compensate the inclination, bringing the AID 504 back to a substantially horizontal position with respect to the bottom of the multi-axis positioning mechanism 1500.

Figure 15C:
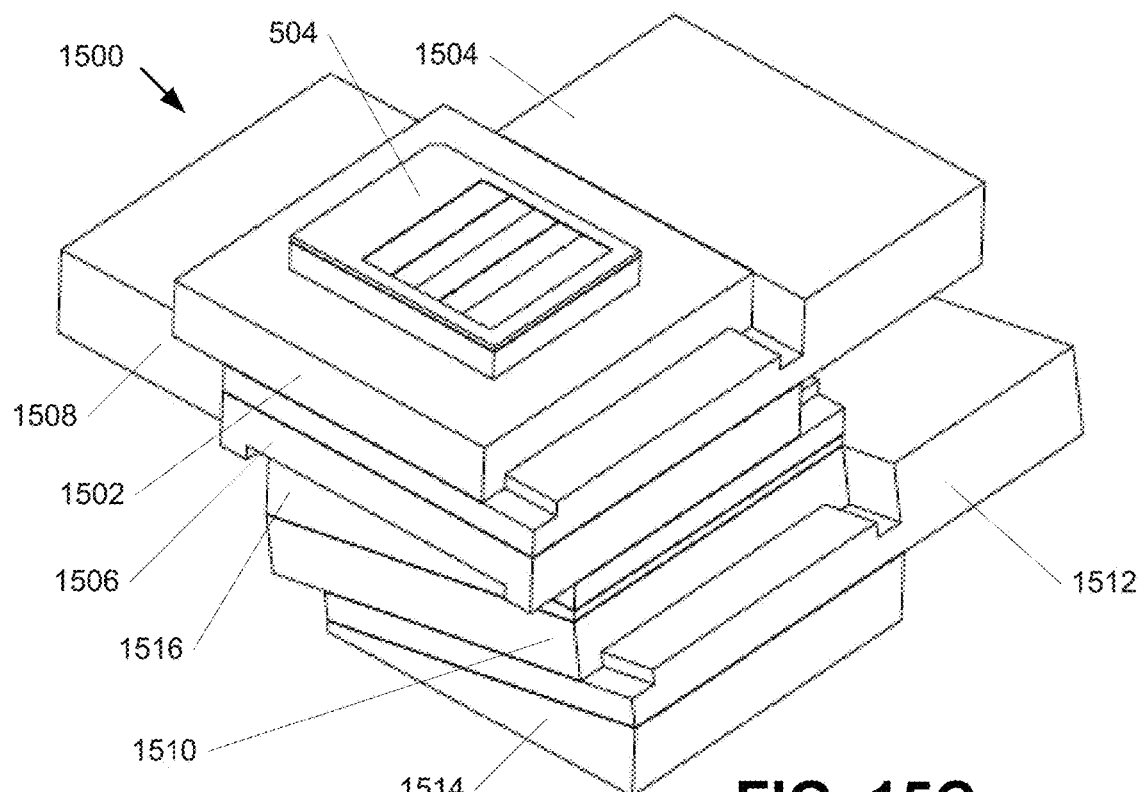
Figure 15D:
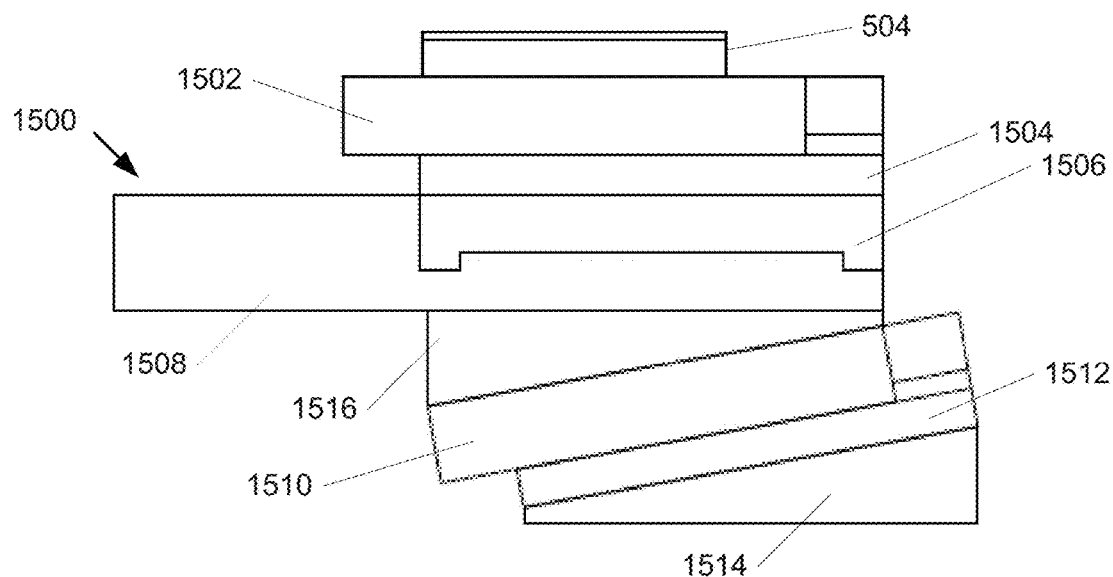

FIG. 15C illustrates an isometric view of the multi-axis positioning mechanism 1500 with each of the platforms 1502, 1506, and 1510 having been moved along their respective rail parts 1504, 1508, and 1512. FIG. 15D illustrates a side view of the same configuration as FIG. 15C.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. An apparatus for imaging a scene having apparent motion, the apparatus comprising:
   an area imaging device having a plurality of pixel sensors;
   a positioning mechanism, the positioning mechanism operable to move the area imaging device along a tracking axis through a run length; and
   a control module configured to:
      direct the positioning mechanism to move the area imaging device in one or more cycles such that the area imaging device is moved, in each of the one or more cycles, forward along the tracking axis at a tracking speed that compensates for a speed of the apparent motion;
      set one or more exposure times for each cycle; and
      direct the area imaging device to take one or more exposures at the one or more exposure times in each of the one or more cycles;
      wherein the one or more exposure times are less than a time of the run length.

2. The apparatus of claim 1, further comprising:
   an imaging module configured to form an image or video of the scene based at least on the one or more exposures.

3. The apparatus of claim 2, wherein:
   the control module is further configured to direct the area imaging device to take the one or more exposures at the one or more exposure times during each of a plurality of cycles to generate a plurality of partially overlapping exposures; and
   the imaging module is further configured to form the image or video of the scene based on the plurality of overlapping exposures.

4. The apparatus of claim 1, wherein:
   the control module is further configured to direct the area imaging device to take at least one first exposure and at least one second exposure during each of the one or more cycles, the at least one first exposure having a first exposure time, and the at least one second exposure having a second exposure time different from the first exposure time; and
   the apparatus further comprises an imaging module configured to generate an image based on partial or full images of the at least one first exposure and the at least one second exposure taken during a common cycle of the one or more cycles.

5. The apparatus of claim 1, wherein:
   the control module is further configured to direct the area imaging device to take at least one first exposure and at least one second exposure in successive cycles of a plurality of cycles, the at least one first exposure having a first exposure time and the at least one second exposure having a second exposure time different from the first exposure time; and
   the apparatus further comprises an imaging module configured to generate an image based on partial or full images of the at least one first exposure and the at least one second exposure taken in the successive cycles to generate a plurality of partially overlapping exposures.

6. The apparatus of claim 5, wherein the control module is further configured to adjust the run length such that an overlap between the at least one first exposure and the at least one second exposure taken in the successive cycles is within a predetermined range of pixels.

7. The apparatus of claim 1, further comprising a multi-band optical filter including a plurality of filter bands, wherein a segment of the scene is exposed through a different one of the plurality of filter bands with successive ones of the one or more exposures.

8. The apparatus of claim 7, wherein the one or more exposure times are set based on the multi-band optical filter.

9. The apparatus of claim 1, wherein:
   the control module is further configured to direct the positioning mechanism to move the area imaging device to be horizontally and/or vertically offset along the tracking axis during each of the one or more cycles, the offset being a sub-pixel displacement between pixel sensors of the plurality of pixel sensors of the area imaging device; and/or
   the apparatus further comprises an imaging module configured to form an image or video based on the one or more exposures from each of the one or more cycles, wherein the image is a higher resolution image relative to an image resolution associated with the one or more exposures.

10. The apparatus of claim 9, wherein the offset is the sub-pixel displacement between two adjacent pixel sensors or a non-integer multiple of a distance between two pixel sensors.

11. The apparatus of claim 1, wherein:
the control module is further configured to
take at least one first exposure during each of the one or more cycles having a first exposure time;
direct the positioning mechanism to move the area imaging device a sub-pixel distance or a multiple of the sub-pixel distance from the tracking axis and/or from a transverse axis perpendicular to the tracking axis; and
take at least one second exposure during each of the one or more cycles having a second exposure time; and
the apparatus further comprises an imaging module configured to generate an image based on partial or full images of the at least one first exposure and the at least one second exposure taken during a common cycle of the one or more cycles.

12. The apparatus of claim 1, wherein the control module is further configured to:
direct the positioning mechanism to align the tracking axis in a direction that is substantially parallel with a direction of the apparent motion.

13. The apparatus of claim 1, wherein the positioning mechanism comprises:
a linear actuator operable to move the area imaging device along the tracking axis; and
a rotational actuator operable to rotate the area imaging device.

14. The apparatus of claim 13, wherein the control module is further configured to direct the rotational actuator to position the area imaging device to set the tracking axis to be substantially parallel with a direction of the apparent motion.

15. The apparatus of claim 1, wherein the positioning mechanism comprises:
a first linear actuator operable to move the area imaging device along a first axis at a first speed; and
a second linear actuator operable to move the area imaging device along a second axis at a second speed, a combination of movement along the first axis and the second axis, at the first speed and the second speed, resulting in movement along the tracking axis.

16. A satellite comprising:
an area imaging device having a plurality of pixel sensors;
a positioning mechanism, the positioning mechanism operable to move the area imaging device along a tracking axis through a run length;
one or more processors;
a memory; and
a plurality of programming instructions stored on the memory and executable by the one or more processors to perform acts including:
directing the positioning mechanism to move the area imaging device in one or more cycles such that the area imaging device is moved, in each of the one or more cycles, along the tracking axis at a tracking speed that compensates for a speed of the apparent motion of a scene being imaged;
setting one or more exposure times for each cycle; and
directing the area imaging device to take one or more exposures at the one or more exposure times in each of the one or more cycles;
wherein the one or more exposure times are less than a time of the run length.

17. The satellite of claim 16, wherein the acts further comprise:
causing the positioning mechanism to move the area imaging device to a position that is offset by a sub-pixel distance or a multiple of the sub-pixel distance between pixels from an initial position of a previous exposure;
causing the area imaging device to take one or more exposures at the sub-pixel distance or the multiple of the sub-pixel distance; and
generating an image or video of the scene based on the one or more exposures at the sub-pixel distance or the multiple of the sub-pixel distance.

18. The satellite of claim 17, wherein:
the offset is along a transverse axis that is perpendicular to the tracking axis to obtain a sub-pixel horizontally offset;
the offset is along the tracking axis to obtain a sub-pixel vertically offset; or
the offset is along both the transverse axis and the tracking axis to obtain a sub-pixel vertically and horizontally offset.

19. The satellite of claim 16, wherein the acts further comprise:
directing the area imaging device to take at least one exposure during each of a plurality of cycles to generate a plurality of partially overlapping exposures; and
generating an image or video of the scene based on the plurality of partially overlapping exposures.

20. The satellite of claim 16, wherein the acts further comprise:
directing the area imaging device to take at least one first exposure and at least one second exposure during each of the one or more cycles, the at least one first exposure having a first exposure time, and the at least one second exposure having a second exposure time different from the first exposure time; and
generating an image based on partial or full images of the at least one first exposure and the at least one second exposure taken during a common cycle of the one or more cycles.

21. The satellite of claim 16, further comprising a multi-band optical filter including a plurality of filter bands arranged such that a segment of an image is exposed through a different one of the plurality of filter bands with successive ones of the one or more exposures.

22. The satellite of claim 16, wherein the acts further comprise:
directing the positioning mechanism to orient the tracking axis such that the tracking axis is substantially parallel with a direction of the apparent motion of the scene.

23. The satellite of claim 16, wherein the acts further comprise:
directing the area imaging device to take at least one first exposure and at least one second exposure in successive cycles of a plurality of cycles, the at least one first exposure having a first exposure time and the at least one second exposure having a second exposure time different from the first exposure time; and
generating an image based on partial or full images of the at least one first exposure and the at least one second exposure taken in the successive cycles to generate a plurality of partially overlapping exposures.

24. The satellite of claim 23, wherein the acts further comprise adjusting the run length such that an overlap between the at least one first exposure and the at least one second exposure taken in the successive cycles is within a predetermined range of pixels.

25. A method of operating an imaging system to image a scene having apparent motion, the method comprising:
- directing a positioning mechanism of the imaging system to move an area imaging device of the imaging system in one or more cycles such that the area imaging device is moved, in each of the one or more cycles, along a tracking axis at a tracking speed that compensates for a speed of the apparent motion;
- setting one or more exposure times for each cycle;
- directing the area imaging device to take one or more exposures at the one or more exposure times in each of the one or more cycles; and
- generating an image of the scene based at least on the one or more exposures.

26. The method of claim 25, further comprising:
- directing the area imaging device to take at least one first exposure and at least one second exposure during each of the one or more cycles, the at least one first exposure having a first exposure time, and the at least one second exposure having a second exposure time different from the first exposure time; and
- generating an image based on partial or full images of the at least one first exposure and the at least one second exposure taken during a common cycle of the one or more cycles.

27. The method of claim 25, further comprising:
- causing the positioning mechanism to move the area imaging device to a position that is offset by a sub-pixel distance or a multiple of the sub-pixel distance between pixels from an initial position of a previous exposure;
- causing the area imaging device to take the one or more exposures at the sub-pixel distance or the multiple of the sub-pixel distance; and
- generating an image or video of the scene based on the one or more exposures at the sub-pixel distance or the multiple of the sub-pixel distance.

28. The method of claim 25, further comprising:
- directing the area imaging device to take at least one exposure during each of a plurality of cycles to generate a plurality of partially overlapping exposures; and
- generating an image or video of the scene based on the plurality of partially overlapping exposures.

29. The method of claim 25, further comprising:
- directing the area imaging device to take at least one first exposure and at least one second exposure in successive cycles of a plurality of cycles, the at least one first exposure having a first exposure time and the at least one second exposure having a second exposure time different from the first exposure time; and
- generating an image based on partial or full images of the at least one first exposure and the at least one second exposure taken in the successive cycles to generate a plurality of partially overlapping exposures.

30. The method of claim 29, wherein the area imaging device is moved, in each of the one or more cycles, along the tracking axis through a run length, the method further comprising adjusting the run length such that an overlap between the at least one first exposure and the at least one second exposure taken in the successive cycles is within a predetermined range of pixels.

* * * * *